(12) United States Patent
Abe et al.

(10) Patent No.: US 7,609,610 B2
(45) Date of Patent: Oct. 27, 2009

(54) DATA TRANSMISSION METHOD, DATA RECEPTION METHOD, TRANSMISSION DEVICE AND RECEPTION DEVICE USING THE SAME, AND COMMUNICATION SYSTEM USING THE SAME

(75) Inventors: Katsuaki Abe, Kawasaki (JP); Takenori Sakamoto, Kawasaki (JP)

(73) Assignee: Panasonic Corporation, Osaka (JP)

(*) Notice: Subject to any disclaimer, the term of this patent is extended or adjusted under 35 U.S.C. 154(b) by 621 days.

(21) Appl. No.: 10/517,178

(22) PCT Filed: Dec. 2, 2003

(86) PCT No.: PCT/JP03/15366

§ 371 (c)(1),
(2), (4) Date: Dec. 7, 2004

(87) PCT Pub. No.: WO2004/051951

PCT Pub. Date: Jun. 17, 2004

(65) Prior Publication Data

US 2005/0185722 A1   Aug. 25, 2005

(30) Foreign Application Priority Data

Dec. 4, 2002 (JP) ............................. 2002-352422
Nov. 14, 2003 (JP) ............................. 2003-384940

(51) Int. Cl.
*H04J 9/00* (2006.01)

(52) U.S. Cl. ..................... 370/204; 370/205; 370/207

(58) Field of Classification Search ............... 370/204, 370/205, 207
See application file for complete search history.

(56) References Cited

U.S. PATENT DOCUMENTS

| | | | |
|---|---|---|---|
| 6,490,270 B1 * | 12/2002 | Krishnamoorthy et al. | 370/347 |
| 6,993,092 B1 * | 1/2006 | Murakami et al. | 375/298 |
| 2003/0002495 A1 * | 1/2003 | Shahar et al. | 370/389 |
| 2003/0021240 A1 * | 1/2003 | Moon et al. | 370/320 |

FOREIGN PATENT DOCUMENTS

| | | |
|---|---|---|
| JP | 2001-077789 A | 3/2001 |
| JP | 2001-211138 A | 8/2001 |
| JP | 2002-084213 A | 3/2002 |
| JP | 2002-261851 A | 9/2002 |

(Continued)

OTHER PUBLICATIONS

"Mobile Communication", by Shuichi Sasaoka, Chapter 5, p. 95-125, published from Ohm Co., Ltd., May 25, 1998, with partial English translation.

(Continued)

*Primary Examiner*—Jason E Mattis
(74) *Attorney, Agent, or Firm*—RatnerPrestia

(57) ABSTRACT

When data is transmitted on a burst basis, a symbol having a higher modulation level is inserted into parts of a burst on a symbol basis and this burst is transmitted. When the data including this burst is received on a burst basis, it is determined which symbol positions are inserted by the symbols having the higher modulation level and which symbol positions are inserted by the other symbols. This method allows increasing a communication capacity while retaining the reliability of the communication.

4 Claims, 17 Drawing Sheets

FOREIGN PATENT DOCUMENTS

| JP | 2002-281003 A | 9/2002 |
|---|---|---|
| JP | 2002-344366 A | 11/2002 |
| WO | WO96/07260 | 3/1996 |
| WO | WO 2004/051951 | 6/2004 |

OTHER PUBLICATIONS

"An Analysis On The Performace Of Variable Symbol Rate And Modulation Level Adaptive Modulation System" by Hidehiro Matsuoka, p. 31-36, The Institute of Electronics, Information and Communication Engineers, Technical Report of IEICE, RCS94-64, (Sep. 1994).

International Search Report for PCT/JP03/15366, dated Mar. 9, 2004.

* cited by examiner

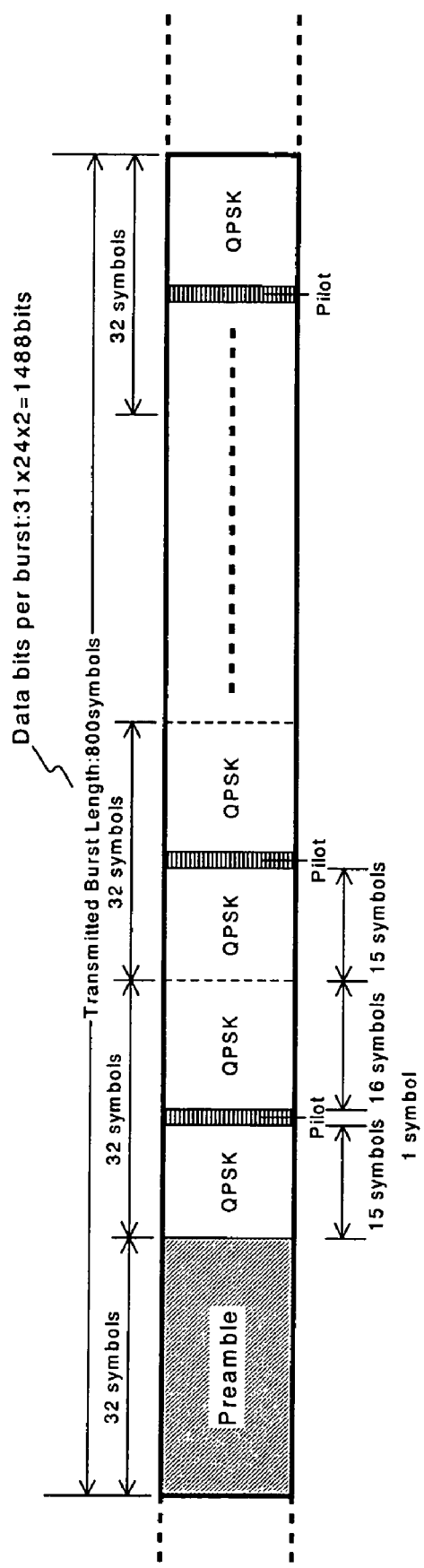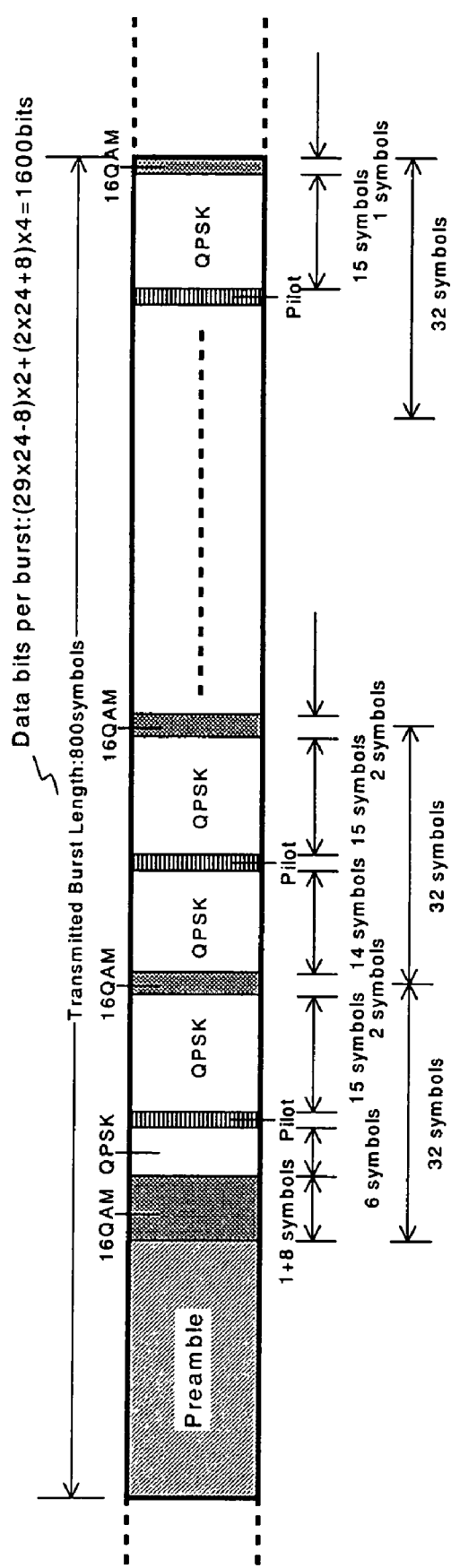

DATA TRANSMISSION METHOD, DATA RECEPTION METHOD, TRANSMISSION DEVICE AND RECEPTION DEVICE USING THE SAME, AND COMMUNICATION SYSTEM USING THE SAME

This Application is a U.S. National Phase Application of PCT International Application PCT/JP2003/015366.

TECHNICAL FIELD

The present invention relates to a data transmission method and a data reception method which mainly transmits/receives signals modulated on a burst basis, transmission devices and reception devices using the same methods, and communication systems using the same methods and the devices.

BACKGROUND ART

Communication, radio communication among others, has become rapidly popular in recent years, so that a higher speed and a greater capacity of communication are required in communication systems. A band having unused radio resource can achieve a higher speed by broadening the band. However, a band having little unused radio resource must employ a technique of using a higher modulation level for increasing its communication speed. This technique upgrades the modulation level at the modulation without changing the occupying bandwidth for modulating signals. This technique can be also applied to the case where a user tries to increase a communication speed within the range of a bandwidth assigned. The foregoing technique is one of effective measures for increasing a communication capacity In the case of mobile communication, a move of a radio station changes conditions of communication channels. In such an environment, a technique of adaptive modulation has been discussed as one of effective measures to enlarge a communication capacity, and yet, this technique can improve the quality of communication. The adaptive modulation technique switches a modulation method to/from another method adaptively in response to conditions of a transmission path. (reference: "Mobile Communication" written by Mr. Shuichi Sasaoka, chapter 5, published from Ohm Co. Ltd. May 25, 1998)

A conventional communication system employing the adaptive modulation technique is described with reference to FIG. 19, and the description refers to not only the structure but also the operation of the system. Between communication devices 001 and 002, a bi-directional communication link and frequency division duplex (FDD) are used. The communication link from device 001 to device 002 is called a forward link, and the link from device 002 to device 001 is called a return link.

In communication device 001, adaptive modulator 0011 modulates transmission data stream 001 by a given modulation method, and transmission processor 0012 converts and amplifies the frequency of stream 001 in a given manner, before transmitting data stream 001. An example of the modulation method used in adaptive modulator 0011 is Quadrature Phase-Shift Keying (QPSK) modulation or hexadecimal Quadrature Amplitude Modulation (QAM). An operation, where those two methods are selectively switched, is described hereinafter.

In communication device 002, reception processor 0021 receives a signal radio-transmitted from device 001, then amplifies the signal and converts the frequency of the signal in a given manner. Adaptively modulated signal demodulator 0022 demodulates the signal by a demodulation method corresponding to the modulation method used in adaptive modulator 0011, thereby obtaining a reception data stream. On he other hand, reception quality estimator 0023 uses the reception signal received by device 002 to estimate communication quality at the forward link.

The communication quality is obtained as reception quality information resulting from the calculation of a CNR value (Carrier Power vs. Noise Power). Reception quality information transmitter 0024 transmits the quality information to communication device 001 via the return link. In device 001, reception quality information receiver 0013 receives the quality information, and modulation method controller 0014 selects an appropriate modulation method to be used at the forward link based on the quality information, and controls adaptive modulator 0011 to use the modulation method thus selected.

Communication device 001 is required to notify device 002 of the information about the modulation method selected. This is done by, e.g. placing a symbol for identifying the information about the modulation method at a given place in a transmission burst, and device 002 recognizes this symbol at the given place, thereby identifying the modulation method to be used.

The structure and operation discussed above allows communication device 001 to monitor the communication quality at the forward link and select a modulation method having enough error tolerance although having a lower modulation level in a condition of poor communication quality. On the contrary, in a condition of excellent communication quality, device 001 selects a modulation method having a higher modulation level for increasing transmission capacity although having less error tolerance. As a result, in the case of poor communication quality, the transmission capacity is kept at a lower level and yet communication reliability is maintained for retaining the communication link. When the communication quality becomes better, the transmission capacity can be increased.

The foregoing conventional structure is obliged to switch a modulation method at least by a unit of a burst, i.e. on a burst basis, or by a unit of plural bursts, so that a probability of reception errors occurring in a burst differs in a great amount depending on QPSK modulation or hexadecimal QAM (hereinafter simply referred to as 16QAM.)

To be more specific, there can be a condition where no error happens at all in the communication by QPSK modulation, but errors can happen in bursts in the communication by 16QAM modulation. It can also sometimes happen that estimation of communication quality by 16QAM modulation becomes difficult while the reception device receives signals modulated by QPSK modulation.

In an actual communication environment, communication quality differs depending on places in a communication burst due to various factors. For instance, in a reception device, which uses a preamble inserted in a burst for time-sync tracking or equalization, reception quality is sometimes relatively excellent at a symbol frame closely following the preamble, and the reception quality becomes relatively poor at a symbol away from the preamble timewise.

In such a communication environment, although a burst has some frames where communication by 16QAM can be done, the conventional adaptive modulation method is obliged to select a modulation method only by a unit of a burst, so that QPSK modulation is resultantly selected. Thus the conventional method can obtain only a little advantage of increasing the communication capacity.

DISCLOSURE OF THE INVENTION

The present invention aims to provide a data transmission method and a data reception method which can increase a communication capacity while communication reliability is retained, transmission devices and reception devices using the same methods, and communication systems using the same methods and the same devices.

A data transmission method of the present invention carries out data communication on a burst basis, i.e. by a unit of a burst, the method comprises the following steps:
- a higher modulation level symbol inserting step for inserting symbols having a higher modulation level into parts of a transmission burst formed at transmission; and
- a transmission burst transmitting step for transmitting transmission bursts including the symbols inserted in the previous step.

A data reception method of the present invention comprises the steps of:
- receiving data transmitted on a burst signal basis; and
- detecting a symbol in response to a symbol position where the symbol having a higher modulation level and being inserted in the burst signal received in the receiving step is placed, and in response to a symbol position where a symbol other than the said symbol is placed.

A transmission device of the present invention in a communication system, which carries out communication on a burst basis by digital modulation between plural communication devices, comprises the following elements:
- a data dividing means for dividing the transmission data at a given ratio;
- a first quadrature vector mapping means for providing a first divided data with a signal space diagram according to a first modulation method;
- a second quadrature vector mapping means for providing a second divided data with a signal space diagram according to a second modulation method having a higher modulation level than the first modulation method; and
- a multiplexing means for placing a symbol modulated by the first modulation method and a symbol modulated by the second modulation method at given places respectively, then multiplexing a transmission burst.

A reception device of the foregoing communication system, which device comprises the following elements:
- a reception processing means for selectively receiving a communication signal, and outputting a burst signal received;
- a dividing means for dividing the burst signal received in response to the given places;
- a first symbol detecting means for detecting symbols of the first divided burst signal in response to the first modulation method;
- a second symbol detecting means for detecting symbols of the second divided burst signal in response to the second modulation method; and
- a data stream multiplexing means for placing the results of the first and the second symbol detecting means in a given order for multiplexing a reception data stream.

According to the foregoing present invention, symbols having a higher modulation level are inserted in parts of a burst, thereby increasing an amount of communication data per burst.

A transmission device of the present invention in a communication system, which carries out communication by multi-carrier modulation between plural communication devices, comprises the following elements:
- a data stream dividing means for dividing the transmission data at a given ratio;
- a first quadrature vector mapping means for point-diagramming signals of first divided data based on a first modulation method;
- a second quadrature vector mapping means for point-diagramming signals of second divided data based on a second modulation method having a higher modulation level than the first modulation method; and
- a sub-carrier multiplexing means for placing the foregoing two kinds of symbols modulated by two modulation methods respectively in given sub-carriers and multiplexing them into a transmission multi-carrier signal.

A reception device of the foregoing communication system comprises the following elements:
- a reception processing means for receiving the signal transmitted from the foregoing transmission device and outputting a multi-carrier signal;
- a sub-carrier dividing means for dividing the multi-carrier signal in response to given sub-carrier positions;
- a first symbol detecting means for detecting symbols of the first divided sub-carrier signal in response to the first modulation method;
- a second symbol detecting means for detecting symbols of the second divided sub-carrier signal in response to the second modulation method; and
- a data stream multiplexing means for placing the results of the first and the second symbol detecting means in a given order for multiplexing a reception data stream.

According to the foregoing present invention, when communication is carried out by multi-carrier modulation, sub-carriers having a higher modulation level are inserted partially, so that an amount of communication data per multi-carrier symbol can be increased.

A data transmission method and the data reception method of the present invention have the following feature: If each symbol position within a burst differs in communication quality or each sub-carrier position in a multi-carrier signal differs in communication quality, the positions where symbols having a higher modulation level are inserted or the positions where symbols based on the second modulation method are inserted are to be assigned in advance to the symbol positions or sub-carrier positions of which communication quality is relatively good.

A transmission device of the present invention comprises the following elements:
- a communication quality information obtaining means for obtaining the communication quality information which tells each symbol position within a burst differs in communication quality; and
- an insertion position detecting means for assigning in advance the positions, where symbols having a higher modulation level are to be inserted or symbols based on the second modulation method are to be inserted, to symbol positions or sub-carrier positions of which communication quality is relatively good.

A reception device of the present invention comprises the following elements:
- a communication quality measuring means for measuring communication quality of each symbol position within a burst of a reception signal;
- a communication quality information notifying means for notifying the transmission device of the communication quality information based on the measurement; and
- an insertion position information obtaining means for obtaining the information about assigning in advance a position, where the symbols having a higher modulation level are to be inserted, to symbol positions or sub-carrier positions of which communication quality are relatively good when the communication quality information tells that each symbol position within a burst differs in communication quality.

According to the foregoing present invention, symbols having a higher modulation level, are inserted in only the places of good communication quality, so that the capacity of communication data can be increased adaptively to the differences in communication quality within each burst or sub-carrier to be transmitted while the communication quality is retained.

A transmission device of the present invention includes a superposing means which is used in the following case: In the case of re-transmitting a part of redundant data of the burst already transmitted in the past following a request signal of re-transmission, the superposing means superposes the data to be partially re-transmitted to a position of a symbol having a higher modulation level.

According to the foregoing present invention, when data is re-transmitted following a hybrid ARQ (automatic re-transmission quest), the partial data can be transmitted free from sacrificing a traffic of regular burst transmission.

The data transmission method of the present invention includes the step of inserting a symbol having a higher modulation level. This step inserts known bit-data in parts of bits of the symbols having a higher modulation level, thereby limiting the quadrature vector mapping at the modulation. The data reception method of the present invention further comprises a step of estimating reception quality for estimating the quality of a reception signal by using the signal having the symbol positions inserted into parts of a burst, where the symbols have a higher modulation level.

The reception device of the present invention further comprises a reception quality estimating means for estimating communication quality by inserting known bit-data into parts of bits thereby limiting the quadrature vector mapping at the modulation, and by using a reception signal vector at a symbol position placed according to the quadrature vector mapping by the second modulation method.

The foregoing present invention allows estimating communication quality which can be a material for detecting whether or not the communication link can be used for the communication by a modulation method using a higher modulation level.

A reception device of the present invention adaptively changes an Euclidean distance in response to communication quality. A transmission device of the present invention places the symbols in accordance with the quadrature vector mapping by the second modulation method away by a given Euclidean distance in response to an amplitude of a symbol in accordance with the quadrature vector mapping by the first modulation method.

A reception device of the present invention places the symbols having a higher modulation level or the symbols placed in accordance with the signal space diagram by the second modulation method away by a given Euclidean distance in response to an amplitude of a symbol in the signal-space diagram by the first modulation method. In the symbols having the higher modulation level, the foregoing present invention allows changing communication reliability of each bit transmitted on a symbol basis.

BRIEF DESCRIPTION OF THE DRAWINGS

FIG. 18 shows a structure of a transmission burst in accordance with the seventh exemplary embodiment of the present invention.

PREFERRED EMBODIMENTS FOR PRACTICING THE INVENTION

The gist of the present invention is to insert symbols having a higher modulation level into parts of a burst, thereby increasing a bit rate of data transmission, increasing reliability of the data by error control, or estimating communication quality appropriately. Exemplary embodiments of the present invention are demonstrated hereinafter with reference to the accompanying drawings.

Exemplary Embodiment 1

In this embodiment, a method of increasing a bit rate of data transmission is described. This method inserts symbols having a higher modulation level than ordinary symbols into a burst when communication on a burst basis is carried out. To be more specific, a method of inserting symbols modulated by 16QAM into parts of a burst modulated by QPSK method.

Figure 1:
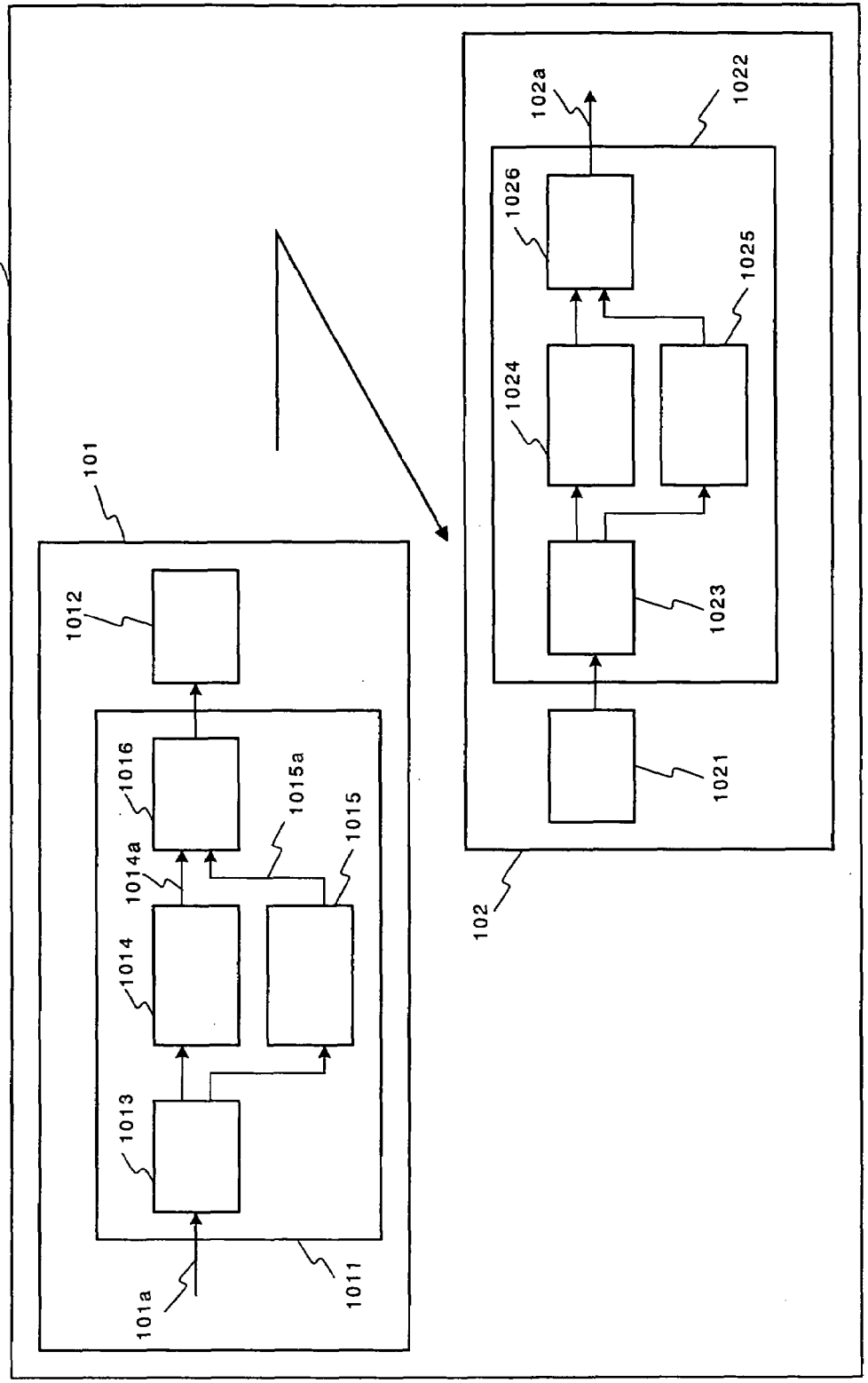
FIG. 1 shows a system diagram illustrating a communication system in accordance with a first exemplary embodiment of the present invention.

FIG. 1 shows a structure of communication system 100 in accordance with the first exemplary embodiment of the present invention. In system 100, transmission device 101 transmits data, and device 101 comprises burst generator 1011 and transmission processor 1012.

Burst generator 1011 receives the data to be transmitted, and carries out modulation in accordance with a given signal space diagram on a symbol basis and generates transmission bursts having a given structure. Generator 1011 comprises data stream divider 1013, modulation method A quadrature vector mapping section 1014, modulation method B quadrature vector mapping section 1015, and multiplexer 1016.

Transmission processor 1012 converts a frequency of the burst signal received into a given carrier-wave frequency band, and amplifies the burst signal to a given power level, then transmits the resultant signal. Processor 1012 comprises a frequency converter, amplifier, band-limit filter, and frequency synthesizer; however, the present invention does not need to specify the structure in detail.

An interface between burst generator 1011 and transmission processor 1012 is not specified in detail, or a frequency band as well as a type of the signal is not specified. However, for instance, an interface of quadrature IQ signal can be used, or a quadrature modulation signal using intermediate frequency (IF) can be used as a carrier-wave.

Data stream divider 1013 divides the data to be transmitted into plural channels at every given number of data, then outputs the resultant data. The way of dividing the data will be described later.

Using the data stream received, modulation method A quadrature vector mapping section 1014 carries out a signal space diagram according to a given modulation method. In this embodiment, QPSK modulation is used as an example of modulation method A, and each two-bits of every symbol is used for providing the bit data stream received-with the signal-space diagram by QPSK modulation.

Using the data stream received, modulation method B quadrature vector mapping section 1015 carries out a signal-space diagram according to a given modulation method. In this embodiment, 16QAM is used as an example of modulation method B, and each four-bit of every symbol is used for providing the bit data stream received with the signal-space diagram by 16QAM.

Multiplexer 1016 receives signal 1014a undergone the signal-space diagram by modulation method A and signal 1015a undergone the signal-space diagram by modulation method B, and multiplexes those two signals by a given method for generating transmission bursts. In this embodiment, signal 1014a undergone the signal-space diagram by QPSK modulation and signal 1015a undergone the signal-space diagram by 16QAM modulation are multiplexd in accordance with the burst structure shown in FIG. 2 for generating the bursts. The burst structure shown in FIG. 2 will be detailed later.

Other elements of transmission device 101 are not specified in this embodiment. However, various circuits can be prepared when necessary such as a circuit providing transmission data with error-correction coding process, a circuit carrying out diversity transmission, a circuit carrying out spectrum divergence process, or a circuit carrying out frequency hopping process.

Reception device 102 receives a signal addressed to itself, and generates reception data. Device 102 comprises reception processor 1021 and reception data stream generator 1022.

Reception processor 1021 receives a signal transmitted from transmission device 101 at a given carrier-wave frequency, and amplifies, selects channels, and converts its frequency, and outputs the resultant reception burst signal. Reception processor 1021 comprises a low noise amplifier, band limiting filter, frequency converter, sync. processor, and gain controller; however, this embodiment does not specify the structure in detail.

An interface between reception processor 1021 and reception data stream generator 1022 is not specified as that between burst generator 1011 and transmission processor 1012 in transmission device 101 has been not specified.

Reception data stream generator 1022 detects a symbol corresponding to a given modulation method depending on the symbol position in a burst signal received, and multiplexes plural bit data obtained into a reception data stream. Generator 1022 comprises divider 1023, modulation method A symbol detector 1024, modulation method B symbol detector 1025, and data stream multiplexer 1026.

Divider 1023 receives a burst signal, and divides the signal in response to each one of the given symbol positions in the burst depending on the respective modulation methods, and outputs the resultant signals. In this embodiment, in order to transmit a burst signal in accordance with the burst structure shown in FIG. 2 from transmission device 102, divider 1023 outputs the signal having a symbol diagram and modulated by QPSK method to symbol detector 1024, and also outputs the signal having a symbol position and modulated by 16QAM method, i.e. modulation method B, to symbol detector 1025. In this embodiment, the information about the modulation method used at each symbol diagram in a burst is known in advance by reception device 102.

Modulation method A symbol detector 1024 provides a signal received with a symbol detection corresponding to modulation method A, and outputs the resultant bit data. In this embodiment, the symbol detection corresponding to QPSK modulation is thus carried out.

Modulation method B symbol detector 1025 provides a signal received with a symbol detection corresponding to modulation method B, and outputs the resultant bit data. In this embodiment, the symbol detection corresponding to 16QAM modulation as modulation method B is carried out.

At each symbol detector (corresponding to method A and method B respectively), compensation for influence on phase, amplitude, or multi-path interference can be done when necessary, before the symbol detection, however, this embodiment does not need to specify the content, process or timing of the compensation.

For instance, the compensation can be done at reception processor 1021, or at a pre-stage of divider 1023. The compensation can be done individually at each symbol detector of the respective modulation methods, or the compensation can be done using both of the signals modulated by the respective modulation methods.

Data stream multiplexer 1026 multiplexes two channels of bit data received by a given method into one bit data stream for outputting.

Figure 2:
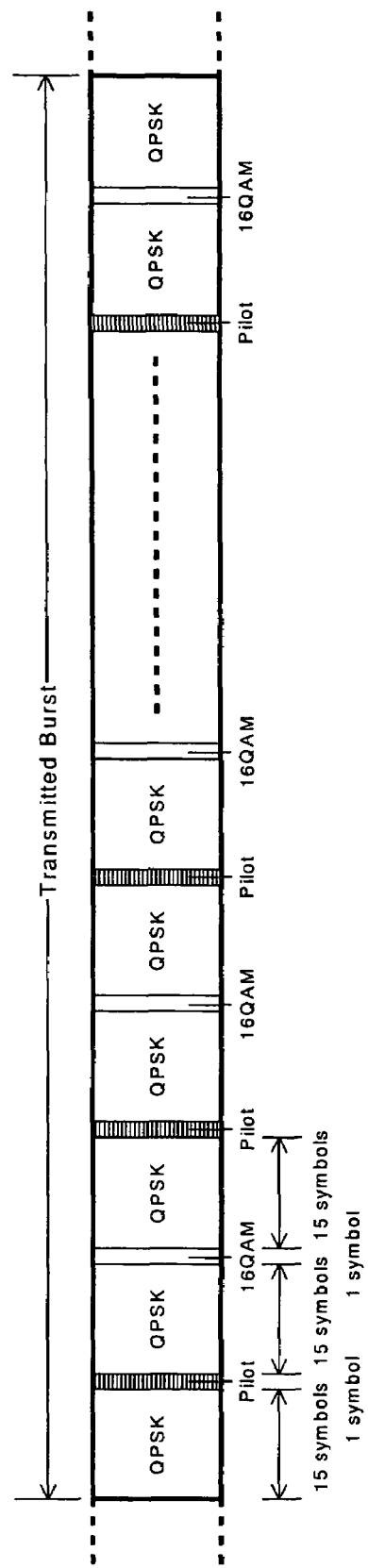
FIG. 2 shows a structure of a transmission burst in accordance with the first exemplary embodiment of the present invention.

In this embodiment, in communicating between transmission device 101 and reception device 102, the communication is carried out in accordance with the burst structure shown in FIG. 2. In FIG. 2, pilot symbols having a known vector are inserted at intervals of every 32 symbols in addition to regular data symbol frame placed in a burst in accordance with the signal-space diagram by QPSK modulation.

The pilot symbol is used for, e.g. compensating for distortion of amplitude or phase undergone in the transmission path when reception device 102 receives and demodulates a burst. A vector value predetermined as the pilot symbol is not specified in detail; however, there is a method to determine the vector: for instance, one of the four signal-points having the maximum amplitude in signal space diagram by 16QAM and agreeing with the vector value is determined as the vector.

The burst structure shown in FIG. 2 includes symbols, each one of those symbols modulated by 16QAM method is inserted at the respective centers of data symbol frames modulated by QPSK modulation method.

The communication from transmission device 101 to reception device 102 can be done by a system where a burst formed of data blocks set in a given or dynamic manner is used in the communication. Therefore, an access method is not specified here. For instance, an access method can be the time division multiple access (TDMA) method, code division multiple access (CDMA) method, frequency division multiple access (FDMA) method, or other methods.

A method and a procedure of the data communication between transmission device 101 and reception device 102 in the system discussed above is demonstrated hereinafter.

In transmission device 101, data stream divider 1013 divides a data stream into two channels, i.e. the input data is divided into a ratio of 60 bits vs. 4 bits, where a portion of 60 bits is to be modulated by QPSK modulation method and a portion of 4 bits is to be modulated by 16QAM, and they are distributed to respective quadrature vector mapping sections 1014 and 1015. Modulation method A quadrature vector mapping section 1014 uses each 2-bits per symbol from every symbol of the bit data received for the signal space diagram in accordance with QPSK modulation.

In a similar manner, modulation method B quadrature vector mapping section 1015 uses each 4-bits per symbol of the bit data received for carrying out the signal space diagram in accordance with 16QAM. Multiplexer 1016 couples the signals placed by respective diagramming sections 1014 and 1015 to each other, and inserts pilot symbols at given places, thereby generating the burst having the structure as shown in FIG. 2. Transmission processor 1012 uses the burst signal generated for carrying out a given frequency conversion and amplification, then transmits the resultant signals to reception device 102.

Reception device 102 receives the signal transmitted from transmission device 101 at reception processor 1021, and provides the signal with given amplification, filtering process for channel selection, frequency conversion, then output a resultant reception burst signal. In accordance with the burst structure shown in FIG. 2, divider 1023 divides the reception burst signal into signals at the symbol place modulated by QPSK method and signals at the symbol place modulated by 16QAM method, then supplies the signals to respective symbol detectors 1024, 1025 corresponding to the foregoing modulation methods.

Modulation method A symbol detector 1024 carries out a symbol detection to the signals undergone the signal space diagram by QPSK modulation method, then outputs the resultant bit data for obtaining 2-bits data per symbol. Modulation method B symbol detector 1025 carries out a symbol detection to the signals undergone the signal space diagram by 16QAM method, then outputs the resultant bit data for obtaining 4-bits data per symbol. Data stream multiplexer 1026 multiplexes the bit data supplied from respective detectors 1024, 1025 into a reception bit data stream in a given order, then outputs the data stream.

As discussed above, the present invention allows increasing an amount of data transmission per burst by providing given parts of symbol positions with the modulation by 16QAM method which has a higher modulation level per symbol than QPSK method. The burst, of which every symbol was supposed to be modulated by QPSK method, can thus transmit a greater amount of data.

In the case of using the burst structure as shown in FIG. 2, the data capacity decreased due to the insertion of pilot symbols can be supplemented with the increment of modulation level by 16QAM method.

In the communication environment where a symbol modulated by QPSK method undergoes a symbol detection free from errors, a symbol modulated by 16QAM method can be advantageously symbol-detected more accurately because of the following fact: a vector value of a QPSK-modulated symbol adjacent to a 16QAM symbol is considered quasi reference-vector similar to the pilot symbol, and the vector value can be used for phase compensation or amplitude compensation.

In this embodiment, QPSK modulation method is used as an example of modulation method A, and 16QAM method is used as an example of method B having a higher modulation level than method A. However, those methods used are only an example, and other methods can be used as long as they have such a relation as method B has a higher modulation level than method A.

For instance, the following structure can be usable: QPSK method is used as modulation method A, and 64QAM method is used as modulation method B, or 16QAM method is used as method A and 64QAM method is used as method B. Further, modulation method B is not limited to any multi-level QAM methods but multi-level PSK method, e.g. 8PSK method, can be used.

The differential QPSK (DQPSK) modulation method can be used as modulation method A. In this case, if pilot symbols are not inserted in a burst, a signal modulated by DQPSK method can be demodulated by differential process, so that the pilot symbols are not necessarily inserted. In such a case, when a signal modulated by 16QAM method used as modulation method B is received, a phase and an amplitude of an adjacent symbol modulated by DQPSK method can be used as a reference vector, thereby placing symbols modulated by 16QAM method at the signal space diagram.

In this embodiment, the structure shown in FIG. 2 is used as an example of a burst structure; however, the structure such as positions of symbols to be modulated by 16QAM method, intervals of inserting the pilot symbols, and a ratio of the numbers of symbols modulated by QPSK, by 16QAM and pilot symbols inserted are just an instance, so that the structure can be changed when necessary depending on a system design. For instance, in a data symbol frame sandwiched by pilot symbols, plural symbols by 16QAM can be inserted instead of the one symbol that is inserted in this embodiment. Insertion places of those symbols are not to be specified; however, e.g. each symbol can be inserted equidistantly, or two consecutive symbols can be inserted. The present invention is not influenced by the presence of pilot symbols inserted, so that a burst having no pilot symbols inserted is available. Instead of the pilot symbol, a symbol frame where consecutive symbols of known value, such as unique word or a sync. word, are prepared can be inserted.

In this embodiment, such factors, as insertion places in a burst and how many symbols having a higher modulation level are to be inserted, are detected in advance between transmission device 101 and reception device 102. If statistic data about communication quality different at each symbol position within a burst is available, the insertion places and the quantity of symbols to be inserted can be determined based on such statistic data.

The difference in communication quality depending on a symbol position in a burst is caused by, e.g. the following factors: when a phase or an amplitude of each symbol is corrected by an interpolation process using a pilot symbol, quality nearby the pilot symbol degrades or quality nearby the intermediate symbol between two pilot symbols degrades depending on an algorithm used in the interpolation process.

Also the following factors cause the quality difference: quality degrades at a burst head where analog characteristics of a radio device is not yet stable, in the case of inserting sync. unique words, quality possibly degrades at a remote place from the unique word, or error-correcting ability different at an error-correction demodulator in a later stage of the reception device.

Insertion places in a burst and quantity of symbols having a higher modulation level are not always determined in advance, although this is described previously. For instance, a setting of insertion places in a burst and quantity of the symbols can be changed dynamically. The third exemplary embodiment will details such a case. In this case, the content of the setting at the transmission device must be notified to the reception device.

This method can be practiced in this embodiment without limitations, for instance, information about the foregoing setting is inserted as control information at parts (e.g. a header) of a transmission burst, or the setting information is notified to the reception device by using another communication system.

In this embodiment, the transmission data is divided into two channels and they are placed together using two modulation methods in a burst; however, the number of channels is not always limited to two, and data can be divided into more than two channels and more than two modulation methods can be used in a burst.

To be more specific, for instance, when greater difference in communication quality exists in a burst, transmission data can be divided into three channels, and QPSK modulation method is used in symbol frames where regular communication quality is retained, and a signal space diagram by 16QAM having a higher modulation level than QPSK method is used in symbol frames where communication quality is better than the regular one. In symbols frames having further better communication quality, signal space diagram by 64QAM is used.

In this embodiment, transmission data in one channel is divided by data stream divider 1013, and the resultant data are supplied to the quadrature vector mapping sections corresponding to the respective modulation methods. However, the present invention is not limited to the foregoing structure. For instance, instead of data stream divider 1013, transmission data divided in advance into two channels can be received, and they are supplied to quadrature vector mapping sections 1014, 1015 corresponding to the respective modulation methods.

The structures of transmission device 101 and reception device 102 used in this first embodiment are described at a minimum level, so that other structures can be added when necessary, which does not influence the present invention. For instance, transmission device 101 can have a structure of generating a burst after providing the transmission data with processes such as error-correction coding, interleave, or puncturing. In response to this structure, reception device 102 can have a structure of providing the reception data stream with processes such as de-interleave, de-puncturing, or error-correction demodulating.

Exemplary Embodiment 2

In this embodiment, a method of increasing a bit rate of data transmission is described. The bit rate can be increased by inserting a sub-carrier having a higher modulation level than a regular sub-carrier into parts of a sub-carrier to be multiplexed in the case of communication by orthogonal frequency division multiplex (OFDM). To be more specific, among all sub-carriers supposed to be modulated by QPSK method, sub-carriers modulated by 16QAM method are inserted into parts of the sub-carriers, then the sub-carriers are transmitted.

Figure 3:
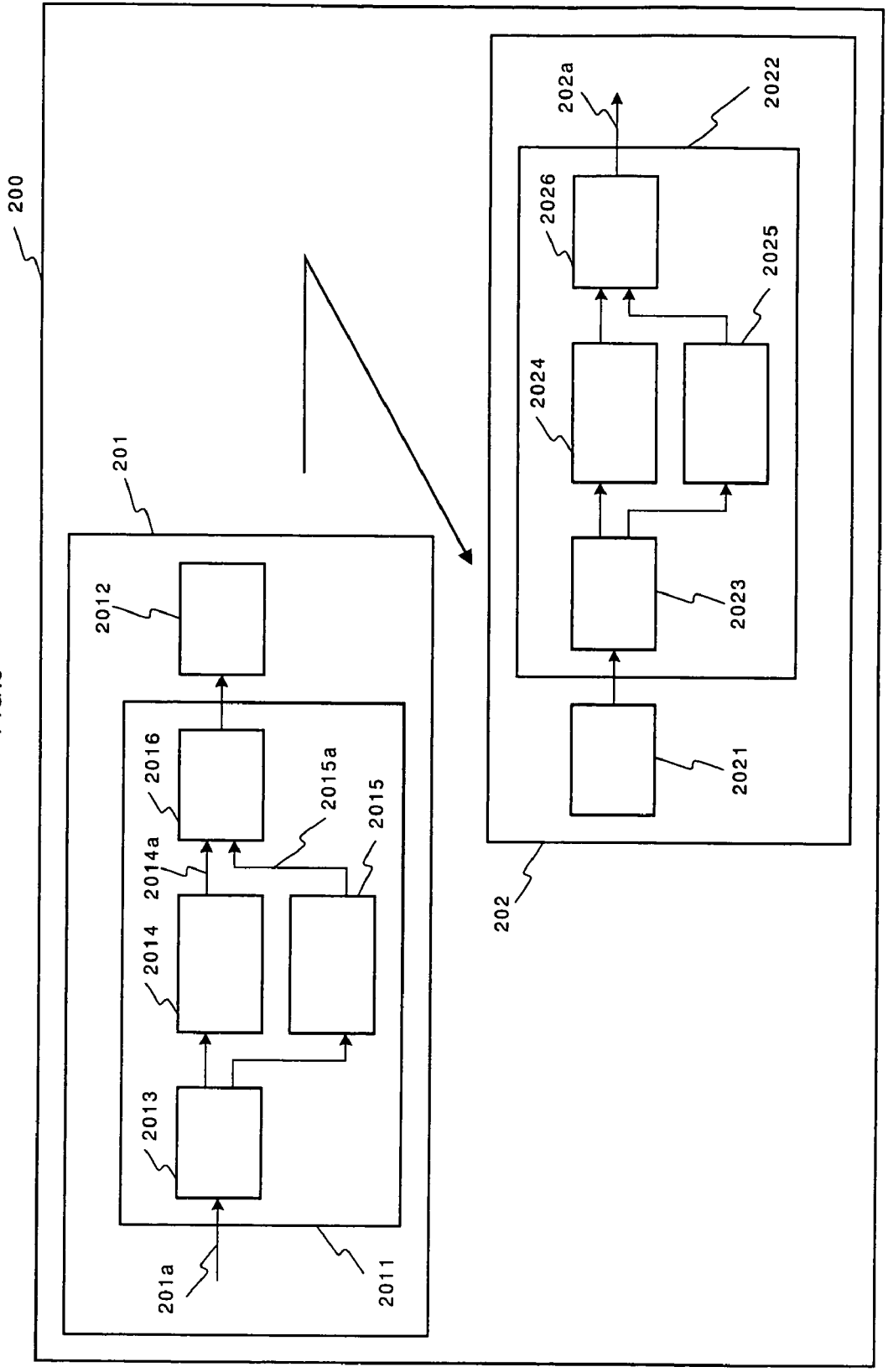
FIG. 3 shows a system diagram illustrating a communication system in accordance with a second exemplary embodiment of the present invention.

FIG. 3 shows a structure of communication system 200 in accordance with the second exemplary embodiment. In system 200, transmission device 201 modulates and multiplexes transmission data 201a by OFDM method before transmitting the data, and device 201 comprises sub-carrier generator 2011 and OFDM transmission processor 2012.

Sub-carrier generator 2011 generates plural sub-carriers by providing transmission data 201a with a first modulation process based on a given signal space diagram. Generator 2011 comprises data stream divider 2013, modulation method A quadrature vector mapping section 2014, modulation method B quadrature vector mapping section 2015, and sub-carrier generator 2016.

OFDM transmission processor 2012 provides an OFDM signal received with a given transmission process, then converts the frequency into a given carrier-wave frequency band and amplifies the signal to a given power, then transmits the resultant signal. The given transmission process is, e.g. to provide the plural sub-carriers received with counter-FFT process, or adds a signal frame to be used for a guard interval when necessary.

In transmitting the data at the given carrier-wave frequency and with the given power, OFDM transmission processor 2012 is equipped with a frequency converter, amplifier, band limit filter, and frequency synthesizer; however, this embodiment does not specify the structure in detail. An interface between sub-carrier generator 2011 and processor 2012 is not specified in this embodiment.

Data stream divider 2013 divides the data to be transmitted based on a given number of data, then outputs the resultant data. The way of division is described later.

Modulation method A quadrature vector mapping section 2014 carries out a signal space diagram to the data stream received according to a given modulation method on a symbol basis. In this embodiment, QPSK modulation is used as an example of modulation method A, and each 2-bits per symbol of bit data stream received is used for carrying out the signal space diagram by QPSK modulation on IQ plane.

Modulation method B quadrature vector mapping section 2015 carries out a signal space diagram to the data stream received according to a given modulation method on a symbol basis. In this embodiment, 16QAM method is used as an example of modulation method B, and each 4-bits per symbol of bit data stream received is used for carrying out the signal space diagram by 16QAM on IQ plane.

Figure 4:
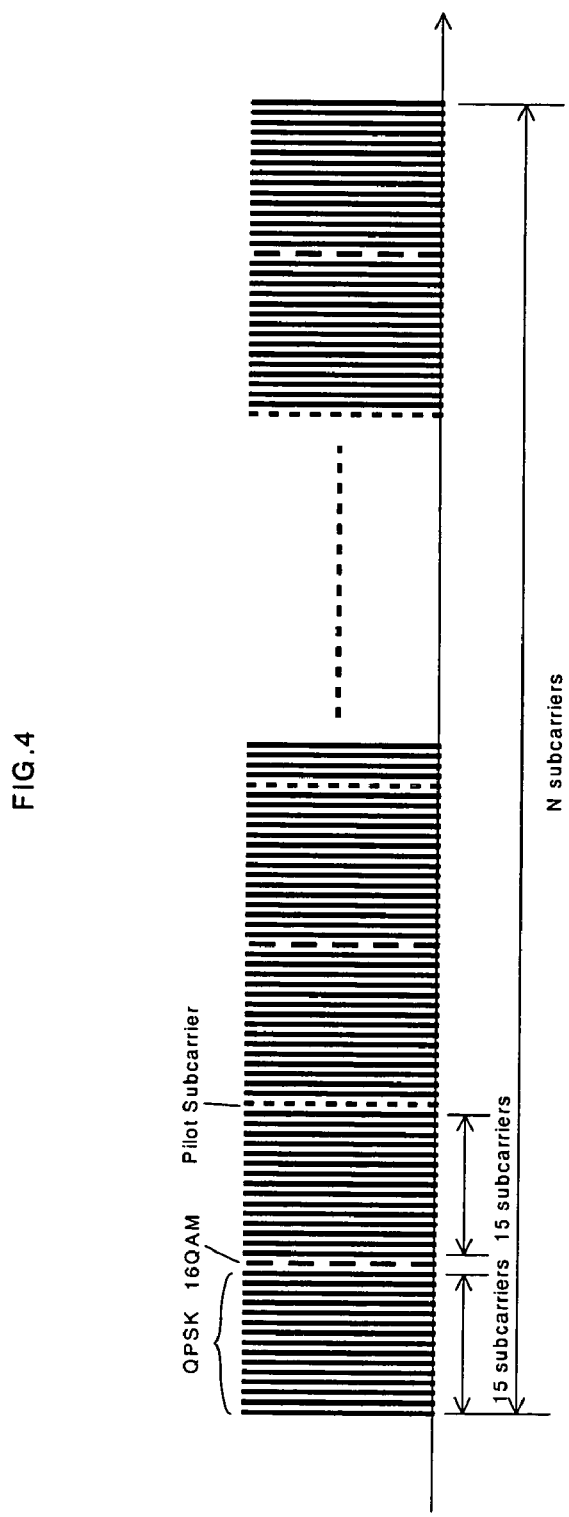
FIG. 4 shows a structure of a sub-carrier of OFDM symbol in accordance with the second exemplary embodiment of the present invention.

Sub-carrier multiplexer 2016 multiplexes sub-carrier 2014a diagrammed by modulation method A and sub-carrier 2015a diagrammed by modulation method B into transmission sub-carriers by a given method. In this embodiment, sub-carriers diagrammed by QPSK modulation and sub-carriers diagrammed by 16QAM method are input, and the sub-carrier structure shown in FIG. 4 is generated. The sub-carrier structure will be detailed later.

Transmission device 201 has other elements than what is described previously; however, this embodiment does not specify the other elements. For instance, a circuit providing transmission data with error correction coding process, or a circuit carrying out divergence process between sub-carriers can be prepared when necessary.

Reception device 202 receives an OFDM signal addressed to itself, and generates reception data. Reception device 202 comprises OFDM reception processor 2021 and OFDM demodulator 2022.

OFDM reception processor 2021 receives an OFDM signal transmitted from transmission device 201 at a given carrier wave frequency, and amplifies the signal, selects a channel, and converts a frequency of the signal, then outputs respective sub-carrier signals of OFDM. OFDM demodulator 2022 comprises a low noise amplifier, a band limiting filter, frequency converter, sync. processor, and an FFT processor which obtains respective sub-carrier components from the reception signal. This embodiment does not specify the structure in detail.

An interface between processor 2021 and demodulator 2022 is not specified also in this embodiment.

OFDM demodulator 2022 detects a symbol corresponding to a given modulation method depending on the sub-carrier position in the OFDM signal received, and multiplexes plural bit data obtained into a reception data. OFDM demodulator 2022 comprises sub-carrier divider 2023, modulation method A symbol detector 2024, modulation method B symbol detector 2025, and data stream multiplexer 2026.

Sub-carrier divider 2023 receives a sub-carrier signal, and divides a signal in response to each one of given sub-carrier positions, and outputs the signals. In this embodiment, in order to transmit an OFDM signal in accordance with the sub-carrier structure shown in FIG. 4 from transmission device 202, divider 2023 outputs the signal at a sub-carrier position shown in FIG. 4 and modulated by QPSK method to symbol detector 2024, and also outputs the sub-carrier signal modulated by 16QAM method to symbol detector 2025. In this embodiment, the information about the modulation method provided at each sub-carrier position is known in advance by reception device 202.

Modulation method A symbol detector 2024 provides a signal received with a symbol detection corresponding to modulation method A, and outputs the resultant bit data. In this embodiment, the symbol detection corresponding to QPSK modulation is carried out, and 2-bits data per symbol is output.

Modulation method B symbol detector 2025 provides a signal received with a symbol detection corresponding to modulation method B, and outputs the resultant bit data. In this embodiment, the symbol detection corresponding to 16QAM modulation as modulation method B is carried out, and 4-bits data per symbol is output.

At each symbol detector (method A and method B), compensation can be done when necessary for influence on phase, amplitude, or frequency-sync error, before the symbol detection, however, this embodiment does not specify the content, process or timing of the compensation. For instance, interpolation process referring to vector values of known pilot sub-carriers cyclically placed in the sub-carrier structure shown in FIG. 4 can be used to compensate for influence on phase, amplitude or frequency-sync error.

This compensation can be done by OFDM reception processor 2021, or at a pre-stage of sub-carrier divider 2023. The compensation can be done individually at each symbol detector of the respective modulation methods, or the compensation can be done using both of the sub-carrier signals of the respective modulation methods.

Data stream multiplexer 2026 multiplexes two channels of bit data received by a given method into one bit data stream for outputting.

In this embodiment, at the communication between transmission device 201 and reception device 202, the communication is carried out by OFDM having the sub-carrier structure shown in FIG. 4. In FIG. 4, pilot sub-carriers having a given vector on IQ plane, i.e. given phase and amplitude, are inserted at intervals of every 32 sub-carriers in addition to regular sub-carriers point-diagrammed by QPSK modulation method into a sub-carrier.

The pilot sub-carrier is used for, e.g. compensating for distortion of amplitude or phase undergone the transmission path when reception device 202 detects symbols of respective sub-carriers. At the respective centers of sub-carrier frames modulated by QPSK method, sub-carriers modulated by 16QAM method and corresponding to one symbol can be inserted.

A method and a procedure of data communication between transmission device 201 and reception device 202 having the foregoing structure are demonstrated hereinafter.

In transmission device 201, data stream divider 2013 divides a data stream into two channels, i.e. the input data is divided into a ratio of 60 bits vs. 4 bits, where a portion of 60 bits are modulated by QPSK modulation method and a portion of 4 bits are modulated by 16QAM, and they are distributed to respective quadrature vector mapping sections 2014 and 2015. Modulation method A quadrature vector mapping section 2014 uses each 2-bits per symbol of the bit data received for modulating data by QPSK method into a signal space diagram.

In a similar manner, modulation method B quadrature vector mapping section 2015 uses each 4-bits per symbol of the bit data received for modulating the data by 16QAM method into a signal space diagram. Sub-carrier multiplexer 2016 couples the signals placed by respective diagramming sections 2014 and 2015 to each other, and inserts pilot sub-carriers at given places, thereby generating the sub-carriers to be used for OFDM transmission and having the structure as shown in FIG. 4.

OFDM transmission processor 2012 uses the sub-carrier signal stream generated for carrying out a given OFDM transmission, i.e. converting signals of the sub-carriers from frequency area to time area by counter FFT process, then when necessary, adding parts of the sub-carrier signals generated as guard intervals. Processor 2012 then provides the sub-carriers with frequency conversion and amplification, and transmits the signals to reception device 202.

Reception device 202 receives the OFDM signal transmitted from transmission device 201 at OFDM reception processor 2021, and provides the signal with given amplification, filtering process for channel selection, frequency conversion, then extracts an OFDM symbol signal. Processor 2021 provides this signal with conversion from time area to frequency area by FFT process, and outputs a sub-carrier signals. Sub-carrier divider 2023 divides, in accordance with the sub-carrier structure shown in FIG. 4, the reception sub-carriers into sub-carriers modulated by QPSK method at the symbol position and sub-carriers modulated by 16QAM method at symbol position, then supplies them to respective symbol detectors 2024, 2025 corresponding to the foregoing modulation methods.

Modulation method A symbol detector 2024 carries out a symbol detection to the sub-carrier signals based on the signal space diagram by QPSK modulation method, then outputs 2-bits data per symbol obtained by the detection. Modulation method B symbol detector 2025 carries out a symbol detection to the signals based on the signal space diagram by 16QAM method, then outputs 4-bits data per symbol obtained by the detection.

Data stream multiplexer 2026 multiplexes the bit data supplied from respective detectors 2024, 2025 into a reception bit data stream in a given order, then outputs the stream.

As discussed above, the present invention allows increasing an amount of data transmission per OFDM sub-carrier by providing given parts of sub-carrier positions supposed to be modulated by QPSK method with the modulation by 16QAM method which has a higher modulation level per symbol than QPSK method. All the sub-carriers supposed to be modulated by QPSK method can thus transmit a greater amount of data.

In the case of using the sub-carrier structure as shown in FIG. 4, the data capacity decreased due to the insertion of pilot sub-carriers can be supplemented with the increment of modulation level by 16QAM method.

In the communication environment where a sub-carrier modulated by QPSK method is symbol-detected free from errors, a symbol modulated by 16QAM method can be advantageously symbol-detected more accurately because of the following fact: a vector value of a QPSK sub-carrier adjacent to a 16QAM sub-carrier is considered quasi reference-vector similar to the pilot symbol, and the vector value can be used for phase compensation or amplitude compensation.

In this embodiment, QPSK modulation method is used as an example of modulation method A, and 16QAM method is used as an example of method B having a higher modulation level than method A. However, those methods used are only an example, and other methods cited in the first embodiment can be used in this second embodiment.

In this embodiment, the structure shown in FIG. 4 is used as an example of a sub-carrier structure; however, the structure such as an insertion positions of sub-carriers modulated by 16QAM method or pilot sub-carriers, intervals of inserting those sub-carriers, a ratio of the numbers of sub-carriers modulated by QPSK method, by 16QAM method and pilot sub-carriers inserted is just an instance, so that the foregoing structure can be changed when necessary depending on a system design. For instance, in a data sub-carrier frame sandwiched by pilots, plural sub-carriers by 16QAM can be inserted instead of the one sub-carrier that is inserted in this embodiment.

Insertion places of those 16QAM sub-carriers are not to be specified; however, e.g. each sub-carrier can be inserted equidistantly, or two consecutive sub-carriers can be inserted. The present invention is not influenced by the presence of pilot sub-carriers inserted, so that a structure where no pilot symbols are inserted can be available.

In this embodiment, factors such as insertion places in a sub-carrier and how many symbols, which have a higher modulation level, are to be inserted, are determined in advance between transmission device 201 and reception device 202; however, the present invention is not limited to this structure. For instance, a setting of those factors can be dynamically changed. In the case of dynamic change of the setting, the third exemplary embodiment will show instances which can be applied to the sub-carrier structure of a multi-carrier signal. In this case, the content of the setting at transmission device 201 must be notified to reception device 202. This embodiment does not specify this method; however, it can be practiced, e.g. in the following way: Information about the foregoing setting is inserted as control information at parts (e.g. a header of an information frame in a higher layer) of a transmission data, or the setting information is notified to reception device 202 by using another communication system.

In this embodiment, transmission data is divided by data stream divider 2013, and the resultant data are supplied to the quadrature vector mapping sections corresponding to the respective modulation methods. However, the present invention is not limited to the foregoing structure. For instance, instead of data stream divider 2013, transmission data divided in advance into two channels can be received, and they are supplied to quadrature vector mapping sections 2014, 2015 corresponding to the respective modulation methods.

Exemplary Embodiment 3

This embodiment describes a method of detecting insertion places of symbols having a higher modulation level than ordinary symbols based on differences in communication quality within a burst. The insertion of symbols is discussed in the first exemplary embodiment, i.e. modulated symbols having a higher modulation level than ordinary symbols are inserted into parts of a burst.

Figure 5:
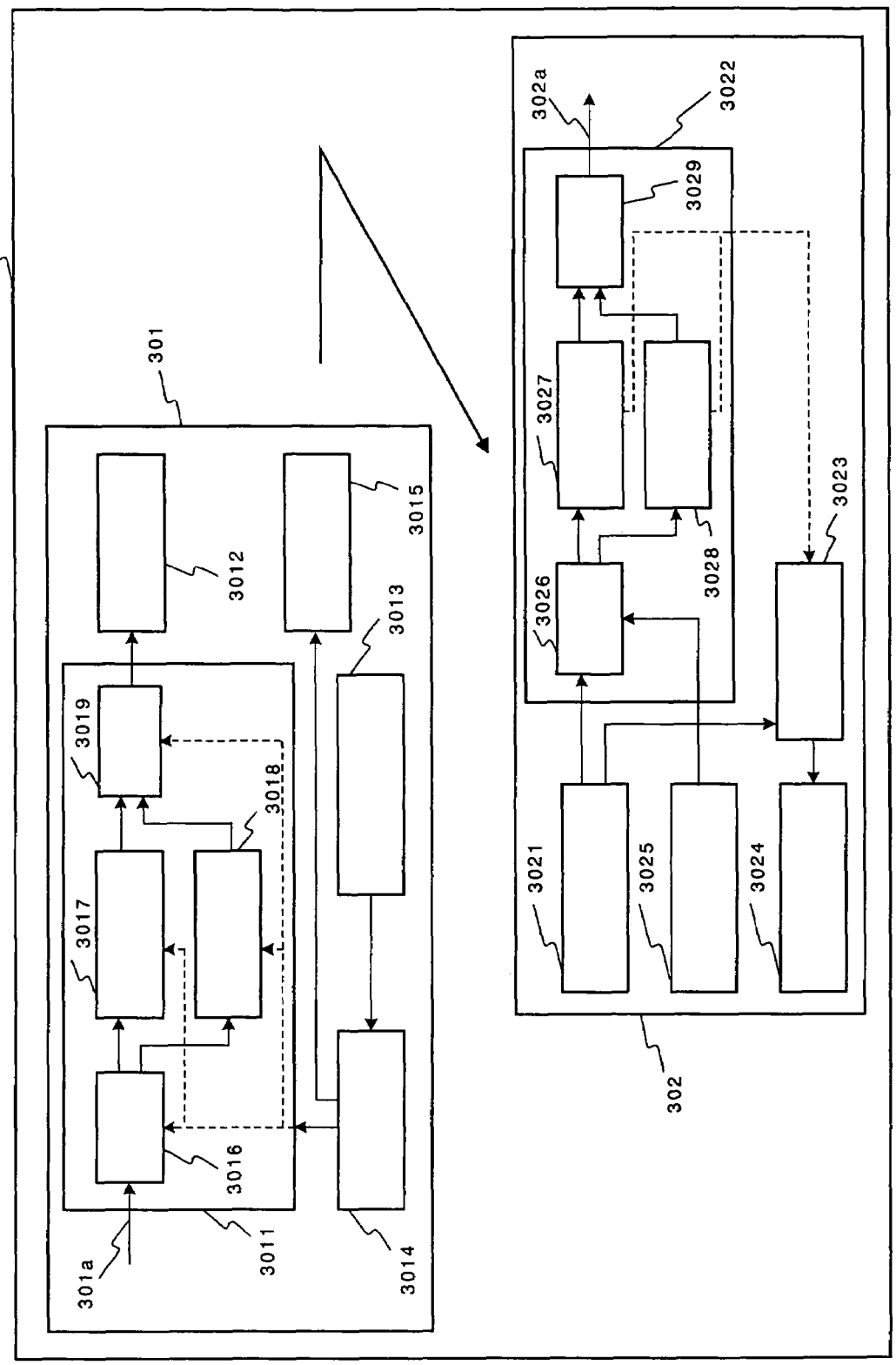
FIG. 5 shows a system diagram illustrating a communication system in accordance with a third exemplary embodiment of the present invention.

FIG. 5 shows a structure of communication system 300 in accordance with the third embodiment. In radio-communication from communication device 301 to communication device 302, this system automatically changes an insertion place of a symbol, having a higher modulation level, based on differences in communication quality depending on symbol positions within a burst. This embodiment uses a multi-number QAM of ordinary symbol as the first embodiment did.

Communication device 301 employs QPSK modulation as modulation method A for transmission, and transmits data, modulated by 16QAM method namely modulation method B, to communication device 302. Device 301 comprises burst generator 3011, transmission processor 3012, in-burst communication quality information obtainer 3013, symbol-having a higher modulation level-insertion place determiner 3014, and symbol-having a higher modulation level-insertion place notifying section 3015.

Burst generator 3011 works basically similar to burst generator 1011 described in the first embodiment, namely, it uses a data stream to be transmitted for generating a modulated symbol and a transmission burst. However, generator 3011 differs from generator 1011 in controlling dynamically the positions and quantity of the symbols modulated in a burst by modulation method B based on determined information about the insertion places. Burst generator 3011 comprises data stream divider 3016, modulation method A quadrature vector mapping section 3017, modulation method B quadrature vector mapping section 3018, and multiplexer 3019. Each one of those elements operates somewhat different from those in the first embodiment, the different points are described later.

Transmission processor 3012 works similar to transmission processor 1012 described in the first embodiment.

When communication is carried out through a communication link (hereinafter referred to as a forward link) from communication device 301 to communication device 302, in-burst communication quality information obtainer 3013 obtains the information about communication quality of every symbol position in a burst structure from communication device 302. In this third embodiment, bi-directional communication link is used between device 301 and device 302, and the in-burst communication quality information is obtained through a communication link (hereinafter referred to as a return link) from device 302 to device 301.

Symbol-having a higher modulation level-insertion place determiner 3014 determines the insertion places and quantity of symbols, having a higher modulation level, to be inserted and, and outputs the determination. This operation will be detailed later.

Symbol-having a higher modulation level-insertion place notifying section 3015 notifies communication device 302 of the information about the insertion places where modulation symbols having a higher modulation level than ordinary symbols are to be inserted in a transmission burst at the forward link. The present invention does not specify any structure for this notification; however, for instance, when a channel exclusive for transmitting data and a channel exclusive for transmitting control information are independently prepared in the communication link from device 301 to device 302, the information about the insertion places can be notified through the channel exclusive for the control information.

Communication device 302 selectively receives a signal addressed to itself through the forward link, thereby generating reception data, and at the same time measures communication quality at each symbol position within a burst, then notify communication device 301 of the result. Device 302 comprises reception processor 3021, Reception data stream generator 3022, in-burst communication quality measuring section 3023, in-burst communication quality information notifying section 3024, and symbol-having a higher modulation level-insertion place information obtainer 3025.

Reception processor 3021 works similar to reception processor 1021 described in the first embodiment.

Reception data stream generator 3022 detects, based on a burst signal received and the information about insertion places of a symbol having a higher modulation level, a symbol corresponding to one of modulation methods A and B depending on the symbol position in a burst signal received, then outputs a Reception data stream generator 3022 comprises divider 3026, modulation method A symbol detector 3027, modulation method B symbol detector 3028, and data stream multiplexer 3029.

Divider 3026 receives a burst signal, and divides the signal in response to each one of the given symbol positions in the burst depending on the modulation methods, and outputs the resultant signals. In this embodiment, based on the information about the symbol insertion places, which information is obtained by symbol-having a higher modulation level-insertion place information obtainer 3025, divider 3026 divides signals on a symbol basis. Elements other than divider 3026 in multiplexer 3022 operate in a similar way as those demonstrated in the first embodiment.

In-burst communication quality measuring section 3023 measures reception quality at each symbol position within a burst of the forward link signal received, and outputs communication quality measured at each symbol position of the forward link. An index value corresponding to the communication quality is not specified here; however, this embodiment calculates CNR (Carrier Power vs. Noise Power) at each symbol position, and ranks the quality based on the resultant CNR values. In this embodiment, this ranking is used as the information about the communication quality.

To be more specific, a CNR greater than a given level is ranked α indicating excellent communication quality, and a CNR lower than the given value is ranked β indicating poor communication quality. The given level is determined according to a system design, so that the present invention does not touch it. Calculation of CNRs at each symbol position can be done every time when a burst is received, or it can be done by averaging the measurement of the past plural busts.

In-burst communication quality information notifying section 3024 notifies communication device 301 of the communication quality measured at each symbol position in the burst received. In this embodiment, this information is transmitted via the return link from device 302 to device 301, and the specific structure is not specified here.

Symbol-having a higher modulation level-insertion place information obtainer 3025 obtains the information about the insertion places from device 301. In this embodiment, the information is transmitted from device 301, e.g. through a communication channel used for transmitting control information.

Figure 6:
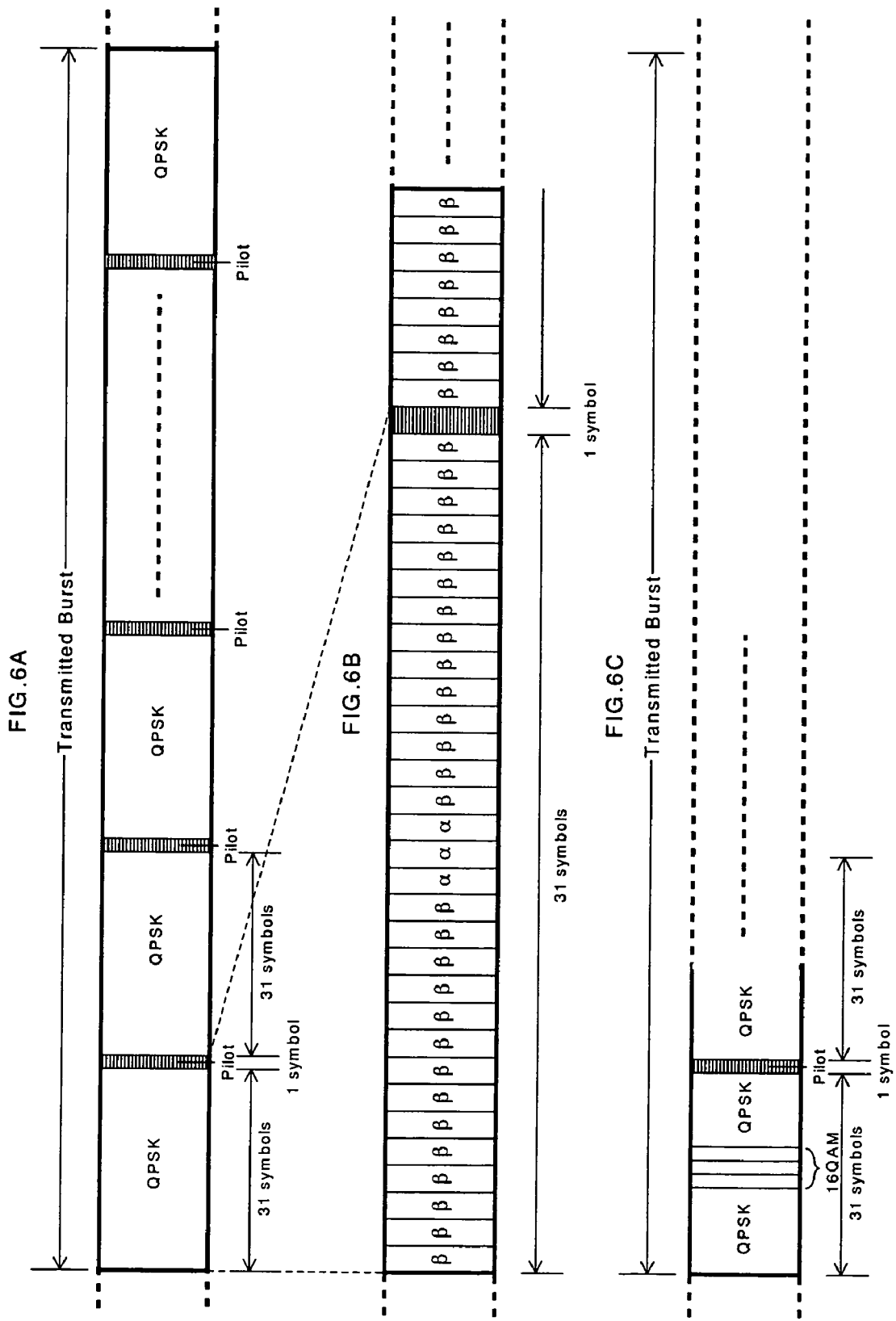
FIG. 6 shows a structure of a transmission burst in accordance with the third exemplary embodiment of the present invention.

In this embodiment, when communication is carried out using the forward link from device 301 to device 302, the burst structure shown in FIG. 6A is used. An insertion place and an insertion interval of pilot symbols are not specified here; however, an insertion interval of 32 symbols is used as an example. A symbol similar to the pilot symbol used in the first embodiment is used as the pilot symbol.

Elements, operating differently from those of the first embodiment, of the foregoing communication system 300 are demonstrated hereinafter at the communication from communication device 301 to communication device 302.

Communication device 301 generates a transmission burst based on the determination about the insertion places of symbols having a higher modulation level. To be more specific, based on the determination, data stream divider 3016 divides transmission data into a bit stream in order to point-diagram the transmission data by modulation method A and another bit stream in order to point-diagram the transmission data by modulation method B.

Modulation method A quadrature vector mapping section 3017 carries out a signal space diagram to a signal modulated by a regular modulation method A. Modulation method B quadrature vector mapping section 3018 carries out a signal space diagram to a signal modulated by modulation method B having a higher modulation level than regular method A. Multiplexer 3019 uses the symbols point-diagrammed by diagramming sections 3017, 3018 assigned to the respective modulation methods, thereby structuring a transmission burst based on the information about the insertion places. Transmission processor 3012 transmits the transmission burst thus structured to communication device 302.

Communication device 302 receives the signal via the forward link thus transmitted from device 301, and divider 3026 of Reception data stream generator 3022 divides the burst signal obtained into signals at each symbol position in the burst. The separation is done based on the information about the insertion places, which information is obtained by information obtainer 3025.

In other words, signals undergone the higher level modulation and placed at the symbol positions are supplied to modulation method B symbol detector 3028, and signals at the other symbol positions are supplied to modulation method A symbol detector 3027. The signals supplied to detectors 3027, 3028 undergo amplitude compensation or phase compensation when necessary before the symbol detection. Data stream multiplexer 3029 multiplexes the bit data detected into a reception data stream, and outputs the stream.

On the other hand, in-burst communication quality measuring section 3023 calculates a reception CNR value at each symbol position in the burst received, and ranks communication quality based on the reception CNR values as α or β. In this embodiment, for instance, assume that reception quality based on reception CNR of a burst received is measured as shown in FIG. 6B. The information about the reception quality of each symbol is notified by in-burst communication quality notifying section 3024 to communication device 301 as the information about the communication quality at each symbol position in the burst at the forward link.

In communication device 301, in-burst communication quality information obtainer 3013 obtains the information about the communication quality at each symbol position in the burst. Based on the information obtained, insertion place determiner 3014 determines the insertion places in a transmission burst at the forward link, where the symbols having a higher modulation level are inserted. For instance, the symbol position ranked α is determined to have excellent communication quality, so that a symbol modulated by modulation method B (16QAM method) having a higher transmission level than ordinary method is inserted. The insertion place information thus determined is supplied to burst generator 3011 and insertion place notifying section 3015.

As discussed above, this third embodiment proves that a data transmission amount per burst can be increased by the following operation: In a burst at communication link, which burst is modulated by QPSK method, communication quality at each symbol position in the burst is measured when the burst is received, and the quality is notified to the transmission side. Based on this notification, the transmission side inserts a symbol modulated by 16QAM method into a place of excellent communication quality, so that a greater data amount per burst can be transmitted than the communication where all the symbols in a burst are modulated by QPSK method.

Further, assignment of symbols modulated by 16QAM method only to the symbol positions of excellent communication quality in a burst allows achieving communication with higher reliability than the communication demonstrated in the first embodiment, where symbols by 16QAM are assigned to predetermined symbol positions in advance. If a burst has excellent communication quality across the burst, 16QAM symbols can be assigned to a greater number of symbols, so that the amount of data transmission can be further increased.

The information about communication quality in a burst received is notified via the return link from device 302 to device 301; however, the notifying means is not limited to this. For instance, if a communication link according to another communication method is disposed between device 301 and device 302, this link can be used.

An existing cellular phone, for instance, can be used as a communication link, and a cable network in stead of radio network can be used for this purpose. The information can be stored in a recording medium temporarily, and the information can be notified to device 301 via this recording medium.

Communication quality is measured at each symbol position in a burst; however, it is not necessarily to measure the quality on a symbol basis, for instance, the quality can be measured at each block formed of plural symbols, and the quality thus measured on a block basis can be notified from device 302 to device 301.

CNR values are measured at each symbol received as index values indicating reception quality, and communication quality is ranked based on the values measured; however, the index value to be used for ranking is not limited to CNR value. For instance, SNR (ratio of reception signal power vs. noise power), SIR ratio (ratio of reception signal power vs. interference power), SINR (ratio of reception power vs. noise+interference power), bit error rate or symbol error rate statistically calculated over past several bursts, or sync error amount of frequency sync or time sync can be used as an index value.

Communication quality is ranked into two grades, i.e. α and β; however, the present invention is not limited to this ranking. For instance, index values can be directly used as information about communication quality, or more than two grades can be prepared, and a modulation level can be increased in response to the number of grades. For instance, the modulation level can be increased stepwise such as 4, 16, and 64.

The communication channel for transmitting control information is used as a notifying means for notifying the insertion places of symbols having a higher modulation level; however, the present invention is not limited to this structure. For instance, the information about the insertion place can be periodically inserted in a transmission burst at a forward link, or another communication medium can be used for notifying communication device 302 of the information.

In this embodiment, device 302 measures the communication quality at each position in a burst received, and notifies device 301 of the measurement result. Device 301 then determines the insertion places where symbols having a higher modulation level are inserted. The present invention, however, is not limited to the foregoing structure. For instance, the communication quality is measured by device 302 as discussed above, and the insertion places can be determined at the forward link, then device 302 transmits a request of inserting symbols having a higher modulation level at the insertion places determined to device 301, which then inserts the symbols having a higher modulation level to comply with the request.

In this case, device 301 does not need a notifying means for notifying device 302 of the insertion places, and device 301 only notifies device 302 of the reception of the request.

The burst structure and operation described in this third embodiment are applicable without question to the sub-carrier structure by OFDM method shown in the second embodiment.

The difference in communication quality is not only caused by distortions on a transmission path of the communication link, but also caused by various steps of processing signals in device 301 and device 302. For instance, convergence characteristics or phase-noise characteristics of oscillating frequency at the multiplexer, influence by distortion at the amplification, difference in compensation capability due to algorithm adopted in phase compensation or amplitude compensation using pilot symbols at the reception, influence due to time sync error or frequency sync error can be a factor. Other analog factors can also cause the difference in communication quality.

Exemplary Embodiment 4

This embodiment describes a method of assigning partial data to be re-transmitted to the bits increased by inserting symbols having a higher modulation level into parts of a burst. The partial data is re-transmitted in a communication system where errors are controlled by hybrid ARQ method.

Figure 7:
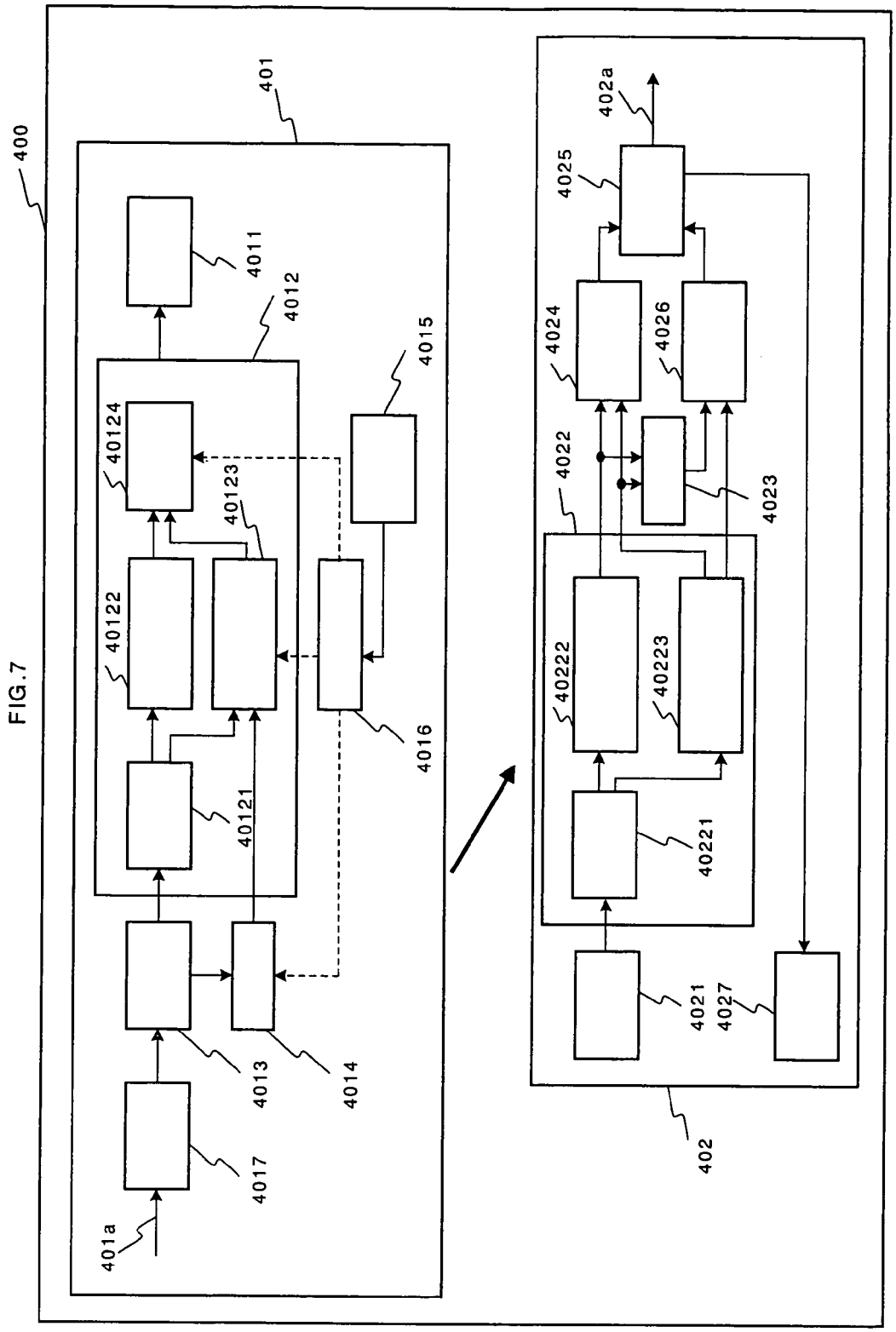
FIG. 7 shows a system diagram illustrating a communication system in accordance with a fourth exemplary embodiment of the present invention.

FIG. 7 shows a structure of communication system 400 in accordance with this exemplary embodiment. In radio communication from communication device 401 to communication device 402, a symbol having a higher modulation level is inserted into parts of a burst.

Communication device 401 transmits the data, and device 401 comprises transmission processor 4011, burst generator 4012, error correction coding section 4013, memory 4014, ACK receiver 4015, re-transmission controller 4016, and error-detection coding section 4017.

Transmission processor 4011 operates similar to transmission processor 1012 described in the first embodiment.

Burst generator 4012 generates modulated symbols according to a given signal space diagram using the data stream to be transmitted, thereby generating transmission bursts. It operates basically similar to burst generator 1011 described in the first embodiment, i.e. a burst includes a part in which symbols are modulated by QPSK modulation method, i.e. modulation method A, based on symbol positions, and another part in which symbols are modulated by 16QAM method, i.e. modulation method B.

Figure 8:
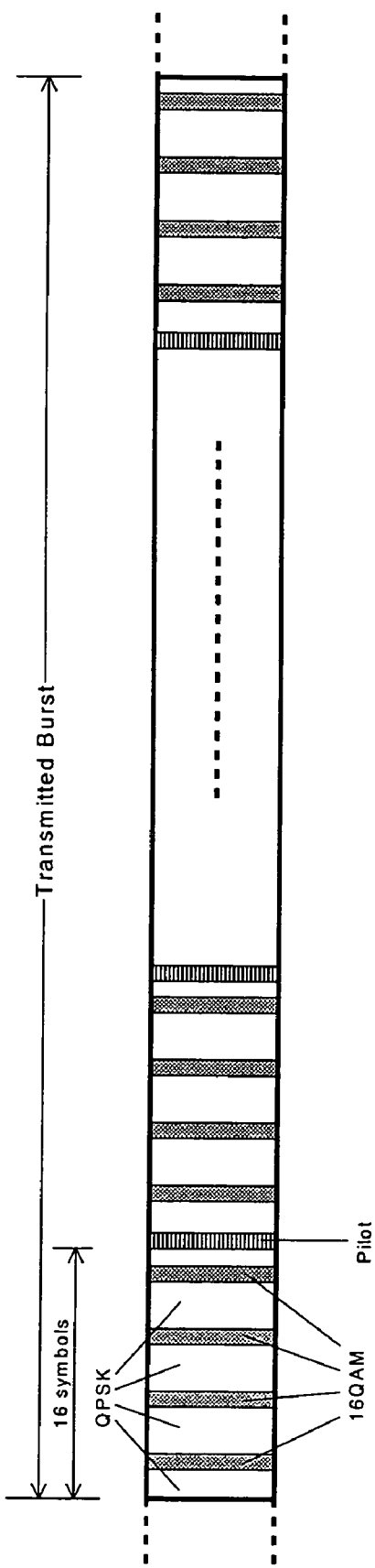
FIG. 8 shows a structure of a transmission burst in accordance with the fourth exemplary embodiment of the present invention.

This fourth embodiment employs the burst structure shown in FIG. 8, and uses the following relation between the signal space diagrams by QPSK method and 16QAM method: a signal space diagram having the max. amplitude by QPSK modulation agrees with a signal space diagram having the max. amplitude by 16QAM method. Different operations done by generator 4012 from burst generator 1011 are described later.

Error correction coding section 4013 provides a transmission data stream with a given error correction coding process, and outputs the coded data stream, and also outputs a redundant section deleted at the coding through another channel. In this embodiment, turbo coding is used as an example of error correction coding process. Bit data deleted by so-called puncture process in the turbo coding process is output through another channel.

Figure 9:
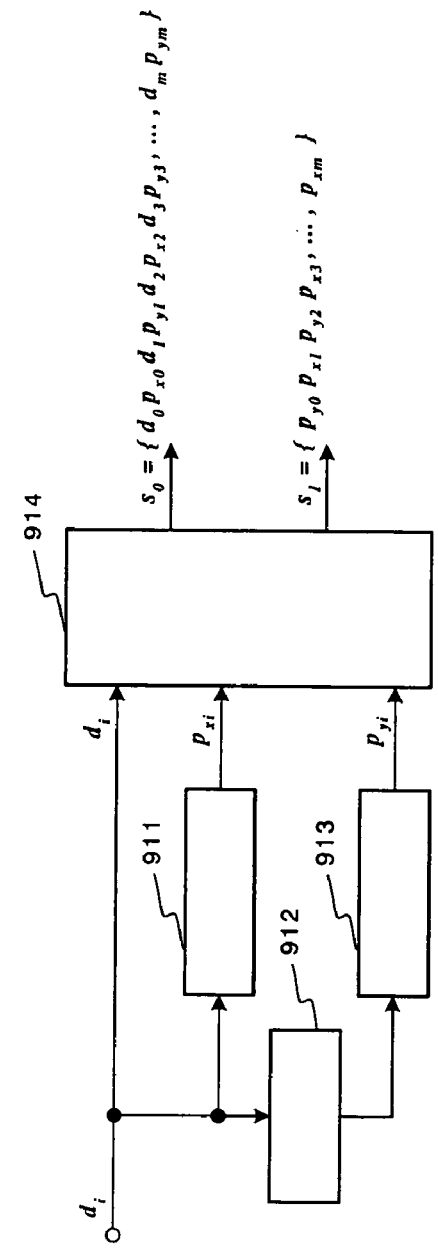
FIG. 9 shows a structure of an error-correction coding means in accordance with the fourth exemplary embodiment of the present invention.

A structure shown in FIG. 9 is an example of well known turbo coding. In this example, output selector 914 encodes, at a coding rate of ⅓, both of an information data stream supplied and a redundant data stream generated. The redundant data stream undergoes recursive-structure convolution coding section A 911, interleaver 912, and recursive-structure convolution coding section B 913 encodes and generates this redundant data by using two channels. Then the redundant data streams are alternately abandoned, and the data stream coded at ½ coding rate is finally output. In this case, the abandoned data streams are output through another channel. The foregoing structure allows the information data stream of N bits to produce an error correction coded data stream of 2×N bits and a redundant bit data stream of N bits.

Memory 4014 stores the bit streams temporarily, and reads them for outputting when necessary.

ACK receiver 4015 receives the ACK information notified from communication device 402, and outputs a signal requesting re-transmission by hybrid ARQ based on the ACK information received. The ACK information indicates whether or not the burst communication via a communication link (hereinafter referred to as a forward link) from device 401 to device 402 is successfully done. In this embodiment, a bi-directional communication link is used between device 401 and device 402, and ACK receiver 4015 obtains the information about in-burst communication quality via a communication link (hereinafter referred to as a return link) from device 402 to device 401.

Re-transmission controller 4016 controls the redundant data of the data transmitted via the forward link in the past to be transmitted by hybrid ARQ based on the request signal from ACK receiver 4015. This operation will be detailed later.

Error detection coding section 4017 encodes a data stream received for detecting an error. In this embodiment, CRC parity coding is used as an example, and the parity generated by the coding is added to the transmission data stream for outputting.

Communication device 402 selectively receives signals addressed to itself via the forward link, thereby generating burst signals. Device 402 comprises reception processor 4021, Reception data stream generator 4022, memory 4023, error corrector 4024, error detector 4025, ARQ error corrector 4026, and ACK transmitter 4027.

Communication processor 4021 operates similar to reception processor 1021 described in the first embodiment.

Reception data stream generator 4022 determines symbols depending on symbol positions in burst signals received in response to the modulation methods applied to symbols. Multiplexer 4022 comprises divider 40221, modulation method A symbol detector 40222, modulation method B symbol detector 40223. Divider 40221 divides the burst signals received according to the modulation methods applied to each symbol position in the burst, and outputs the resultant signals.

In this embodiment, when device 401 transmits the burst signals, only the signals at the symbol positions, where the data re-transmitted by the hybrid ARQ method is superposed, are divided and supplied to modulation method B symbol detector 40223. The signals of the other symbols are divided and supplied to modulation method A symbol detector 40222, which operates similar to modulation method A symbol detector 1024 shown in FIG. 1.

Modulation method B symbol detector 40223 operates basically similar to modulation method B symbol detector 1025 shown in FIG. 1. However, detector 40223 differs from symbol detector 1025 in outputting signals in two channels after the symbol detection by modulation method B, i.e. 16QAM method. This operation will be detailed later.

Error corrector 4024 provides the bit data stream received and undergone the symbol detection with a given error correction process. In this embodiment, a turbo decoding process corresponding to the error correction coding process done in device 401 is carried out. Two channels are subject to the decoding, which will be detailed later.

Error detector 4025 detects errors in the bit data stream received for outputting the detection result, and also extracts the data section for outputting. In this embodiment, CRC parity is added to the data, so that error detection based on the CRC coding is carried out, and only the data section without the parity section is output as a reception bit data stream.

In the case of re-transmission by hybrid ARQ, ARQ error corrector 4026 provides the previous reception result in addition to the re-transmitted data by the hybrid ARQ with an error correction decoding process, and outputs a decoding result. This operation will be detailed later.

ACK transmitter 4027 notifies communication device 401 of a result whether or not the bursts at the forward link are received normally as ACK information. To be more specific, transmitter 4027 sends the information to device 401 via the return link whether successful reception (ACK) or failure in reception (NACK) is done in response to detection of no errors or detection of errors when the bursts are received.

In this fourth embodiment, the burst structure shown in FIG. 8 is used in the communication from device 401 to device 402. To be more specific, one pilot symbol is inserted with respect to 16 data symbols, and a data symbol frame regularly undergoes QPSK modulation. In the case of re-transmission by hybrid ARQ, four symbols out of 16 symbols are superposed with the bits to be re-transmitted, then the four symbols undergo 16QAM.

In the foregoing communication system 400, data communication is carried out between device 401 and device 402, and partial data is re-transmitted by hybrid ARQ when necessary, thereby controlling errors. The method and the procedure of this operation are demonstrated hereinafter.

The data to be transmitted from device 401 to device 402 is added CRC parity by error detection coding section 4017, then supplied to error correction coding section 4013, which then encodes the data by the turbo coding method. Coding section 4013 supplies the data stream coded (data stream s0 shown in FIG. 9) to burst generator 4012, and on the other hand, it supplies a redundant bit stream (data stream s1 shown in FIG. 9) deleted at the coding to memory 4014 for storing the stream temporarily.

Burst generator 4012 divides the received data stream at a given rate at its data stream divider 40121. In this embodiment, the burst structure shown in FIG. 8 is considered a structure to be used in the transmission at the forward link, so that 4 symbols in a data frame of 16 symbols sandwiched by pilot symbols are modulated by 16QAM method, and remained 16 symbols are modulated by QPSK modulation method.

The bit data streams received are divided every 2-bits at each symbol position where the symbol is to undergo a signal space diagram. In this case, two bits out of the 4 bits necessary for the signal space diagram by 16QAM are supplied to modulation method B quadrature vector mapping section 40123. If this signal space diagram takes a shape shown in FIG. 10, the two bits supplied are placed at higher two bits.

Modulation method B quadrature vector mapping section 40123 operates differently in the following two cases: when re-transmission by hybrid ARQ is carried out from device 401 to device 402, and when the re-transmission is not carried out, i.e. regular data transmission only is carried out. When no re-transmission is carried out, modulation method B quadrature vector mapping section 40123 assigns the two bits supplied from divider 40121 to higher two bits of a symbol modulated by 16QAM method, and assigns a fixed value to the lower two bits.

As the fixed value, "00" is used, so that a signal space diagram equivalent to that by QPSK modulation is done. When the re-transmission by hybrid ARQ is carried out, quadrature vector mapping section 40123 assigns the two bits supplied by divider 40121 to the higher two bits, and also reads the partial data to be re-transmitted out from memory 4014, and assigns it to the lower two bits.

In this embodiment, bit data of a quarter of the data already transmitted can be re-transmitted by hybrid ARQ. For instance, data stream S2=[py0, py2, py4, , , , pym−1], which is bit data of a half of data stream s1, is selectively read out from the past data stream s1 stored and shown in FIG. 9, and is assigned to the lower two bits.

Meanwhile, modulation method A quadrature vector mapping section 40122 modulates a signal by QPSK method and places the resultant symbols at a signal space diagram by QPSK method by using the two bits supplied to each symbol. This operation is the same as that in the first embodiment.

Multiplexer 40124 multiplexes the signals at each symbol position diagrammed by respective quadrature vector mapping sections 40122 and 40123, and transmission processor provides the resultant signals with a necessary process for transmission, then transmits the signals as the forward link to device 402.

Communication device 402 receives the burst signals via the forward link, and supplies them to Reception data stream generator 4022, which then divides the signals on a symbol basis in the burst at its divider 40221. In other words, a signal at symbols modulated by QPSK modulation method and undergone the signal space diagram is supplied to modulation method A symbol detector 40222, and a signal at symbols modulated by 16QAM method and undergone the signal space diagram is supplied to modulation method B symbol detector 40223.

Symbol Detector 40222 provides the signal stream modulated by QPSK method with amplitude compensation or phase compensation when necessary, then carries out symbol detection, thereby obtaining 2-bits data for each symbol. Symbol detector 40222 supplies the 2-bits data obtained to error corrector 4024, and at the same time, stores the 2-bits data in memory 4023.

Symbol detector 40223 provides the signal stream modulated by 16QAM method with amplitude compensation or phase compensation when necessary, then carries out symbol detection, thereby obtaining 4-bits. Since the higher 2-bits out of 4-bits obtained have been transmitted as regular transmission data, they are supplied to error corrector 4024, and also supplied to memory 4023 for storing them temporarily. The lower 2-bits are assigned with the data re-transmitted in the case of re-transmission by hybrid ARQ, or assigned with a fixed value when re-transmission is not done. In the case of re-transmission, the bit data stream re-transmitted is supplied to ARQ error corrector 4026.

Using the bit data stream received, error corrector 4024 carries out an error correction decoding process. In this embodiment, a turbo decoding process is provided, and the bit data stream undergone the decoding process is supplied to error detector 4025, which detects errors from the bit data stream supplied by using the CRC parity added to the data at the transmission and extracts data section. At the same time, error detector 4025 supplies a detection result to ACK transmitter 4027.

Based on the detection result received, ACK transmitter 4027 notifies device 401 of NACK when errors are detected in the bursts received, thereby notifying device 401 of a failure in reception and a request of re-transmission. In the case of no errors, transmitter 4027 notifies device 401 of ACK indicating a successful reception. The ACK or the NACK is transmitted via the return link from device 402 to device 401.

Communication device 401 receives, via the return link, the information of the ACK or the NACK about the forward link transmitted from device 402 at its ACK receiver 4015, and the information received is supplied to re-transmission controller 4016.

Controller 4016 carries out the following control operation based on the information of the ACK or the NACK received. In the case of receiving the ACK, no re-transmission is done, and in the symbols supposed to undergo the signal space diagram by modulation method B, regular transmission data only are transmitted in a similar form to the signal space diagram by QPSK modulation method.

On the other hand, in the case of the NACK, parts of the redundant data stored in memory 4014 are read out and supplied to modulation method B quadrature vector mapping section 40123, then superposed to the lower 2-bits of a symbol data at the signal space diagram by 16QAM, so that re-transmission by hybrid ARQ is carried out together with the regular transmission data. Meanwhile the redundant data was generated when transmission data corresponding to a burst, which burst failed in reception at the forward link, underwent the error correction coding. Then the redundant data has been temporarily stored in memory 4014. Controller 4016 carries out the control operation as discussed above.

Re-transmission controller 4016 controls such that the redundant bit data stream of the past transmission data, which have been marked with ACK (no errors detected), can be deleted from memory 4014.

ARQ error corrector 4026 of device 402 reads a bit data stream of the past reception bursts temporarily stored in memory 4023 when the re-transmission by hybrid ARQ is carried out. Then corrector 4026 provides the bit data stream read-out and the partial redundant bit data re-transmitted by hybrid ARQ and obtained by detector 40223 with an error correction decoding process. Use of the re-transmitted redundant data in the decoding process allows more positive error-correction.

The data stream undergone the decoding process is supplied to error detector 4025, which then detects an error from the data stream using CRC parity. If an error is detected again from the data stream re-transmitted, detector 4025 can notify device 401 of the error and a request of another re-transmission of redundant data different from the data re-transmitted previously.

As discussed above, this fourth embodiment proves that both of the communication capacity and the reliability can be increased because the data can be partially re-transmitted without sacrificing a traffic of regular transmission data in the following case: in the system where communication via a forward link by QPSK modulation is carried out, when partial data must be re-transmitted by hybrid ARQ, the higher level of modulation to a given symbol place in a transmission burst, so that the partial data to be re-transmitted can be superposed to the bits increased. This operation allows re-transmitting the partial data without sacrificing the traffic of the regular transmission bursts. This sacrifice occurs when re-transmission is needed in a general ARQ system.

In this embodiment, when a redundant data of a past transmission burst is re-transmitted by hybrid ARQ, a method of identifying which burst transmitted in the past corresponds to the redundant data to be re-transmitted is not described, because the present invention is not limited to this identifying method. Various methods of identifying bursts are already disclosed. For instance, an ID number is assigned to each transmission burst, and when ACK or NACK is notified, this ID number is attached to the ACK or the NACK. In re-transmitting the data, this ID number is also attached to the data.

In this embodiment, symbols at given symbol positions in a burst are modulated by modulation method B regardless of re-transmitting partial data by hybrid ARQ or no re-transmission, however, the present invention is not limited to this method. For instance, when the re-transmission by hybrid ARQ is not done, all the symbols in a burst can be determined by modulation method A symbol detector 40222.

In this case, the information whether or not the re-transmission by hybrid ARQ is done must be notified from device 402 to device 401; however, the notifying means is not necessarily specified in the present invention. An example of the notifying means is this: a flag indicating the necessity of re-transmission is attached to a particular symbol position in a burst, and the necessity of a re-transmission can be identified with this flag.

In this embodiment, a half of bit data of the redundant bit data temporarily stored in memory 4014 is superposed when partial data is re-transmitted by hybrid ARQ; however, the present invention is not limited to this method. For instance, the number of symbols, to which the data to be re-transmitted is superposed, is increased in a burst (i.e. symbols are placed according to modulation method B), and all the redundant bit data are re-transmitted.

On the contrary, the number of bit data to be re-transmitted is reduced, and the number of symbols to receive the superposition can be reduced by 16QAM method. It depends on a system design to determine how many symbols are to be used for superposing the data to be-retransmitted.

In this embodiment, errors in the data re-transmitted by hybrid ARQ are corrected by ARQ error corrector 4026; however, the present invention is not limited to this structure. The errors in the data re-transmitted can be also corrected by error corrector 4024.

In the case of transmitting regular data only without no re-transmission by hybrid ARQ, modulation method B quadrature vector mapping section 40123 inputs a fixed value of "00" to the lower 2-bits, so that the signal space diagram equivalent to that by QPSK modulation is formed. However, the present invention is not limited to this method.

For instance, the vector positions of four signal points by QPSK modulation agree with the vector positions of four signal points by 16QAM, which four signal points have "11" at their lower 2-digits, and "11" as a fixed value can be assigned to the lower 2-bits. In other words, when no re-transmission by hybrid ARQ is done, in the symbol positions where signal-space diagram was supposed to be formed according to 16QAM method, symbols are placed equivalently to what is done by regular QPSK method. When the re-transmission is done, data with a greater amplitude than QPSK modulation can be transmitted by 16QAM.

In the case of a system where an average power is identical to respective symbol positions by QPSK modulation method and by 16QAM method, it is not necessarily for the signal points by QPSK modulation to agree with the four signal points by 16QAM.

In this embodiment, symbol detectors 40222, 40223 detect symbols according to the respective modulation methods, and output the bit data streams obtained by the detectors. The bit data streams are not always values by hard-decision but they can be values by soft-decision without question for outputting.

Exemplary Embodiment 5

Previous embodiments 1-4 have demonstrated that the symbols having a higher modulation level are inserted in parts of a transmission burst, thereby obtaining various advantages. This fifth embodiment describes another example of signal space diagram, where the symbols are modulated by modulation method B having a higher modulation level. To be more specific, modulation method C quadrature vector mapping section 501 (not shown in the drawings) which carries out a signal space diagram different from that by 16QAM is disposed instead of the modulation method B quadrature vector mapping section described in previous embodiments 1-4, and modulation method C symbol detector 502 (not shown) is disposed instead of the modulation method B symbol detector.

Modulation method C quadrature vector mapping section 501 places symbols at 16 signal-points where 4-bits are input to each symbol. In the quadrature (IQ) plane shown in FIG. 11, black points indicate the signal space diagram by modulation method C, and white points indicates the signal space diagram by modulation method A, i.e. QPSK modulation method. Assume that an IQ component of each signal point by QPSK modulation is ($\pm a$), and that of each signal point by modulation method C is ($\pm a \pm b$).

The value of "b" is determined relative to amplitude "a" of the IQ component modulated by QPSK modulation method. In this embodiment, $b=a/3$ is used as an example. The foregoing signal space diagram allows signal-points, having smaller amplitudes, out of 16 signal-points to be away from axes I and Q which indicate threshold values, so that an Euclidean distance which is used for detecting the higher 2-bits becomes longer. As a result, the reliability of the communication improves. On the contrary, the Euclidean distance of the bits assigned to the lower 2-bits becomes shorter than the signal space diagram by 16QAM, so that the reliability of the communication lowers.

Modulation method C symbol detector 502 provides each component of I and Q with a threshold-detection at amplitude of "0" and "±a", thereby detecting a symbol received. A vector value of pilot symbols existing around or a vector value of signal-point of a symbol modulated by QPSK modulation method can be used for finding the value of "a".

Figure 11:
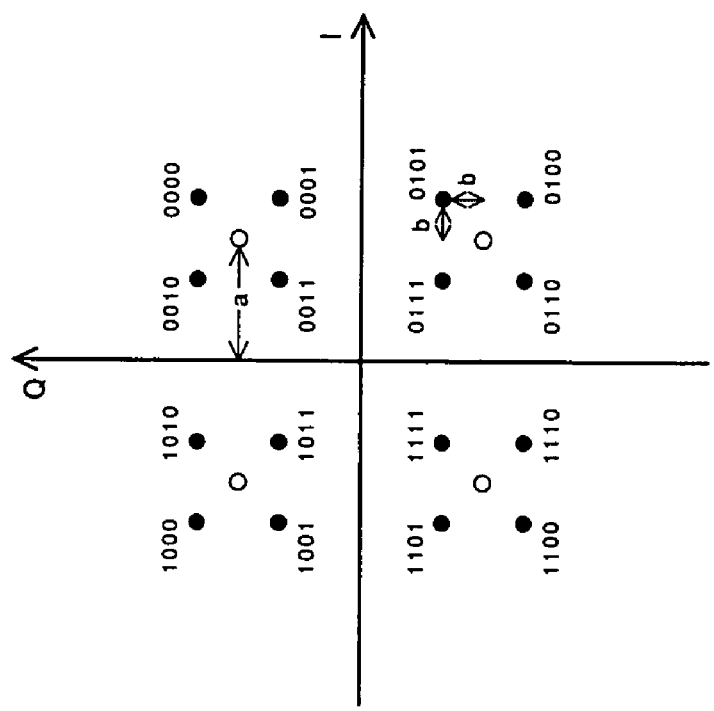
FIG. 11 shows a signal space diagram by modulation method C in accordance with a fifth exemplary embodiment of the present invention.

As discussed above, this fifth embodiment proves that reliability of communication can be changed at each bit per symbol to be transmitted by the following method: In a transmission burst, a signal space diagram of symbols having a higher modulation level is set at an Euclidean distance with reference to the signal points by QPSK modulation as shown in FIG. 11 and different from the distance by 16QAM. As a result, as already shown in the fourth embodiment, when higher 2-bits out of 4-bits are used for regular data to be transmitted and the lower 2-bits are assigned to redundant bits to be transmitted by hybrid ARQ, the foregoing method allows improving the reliability of the transmission data.

Figure 12:
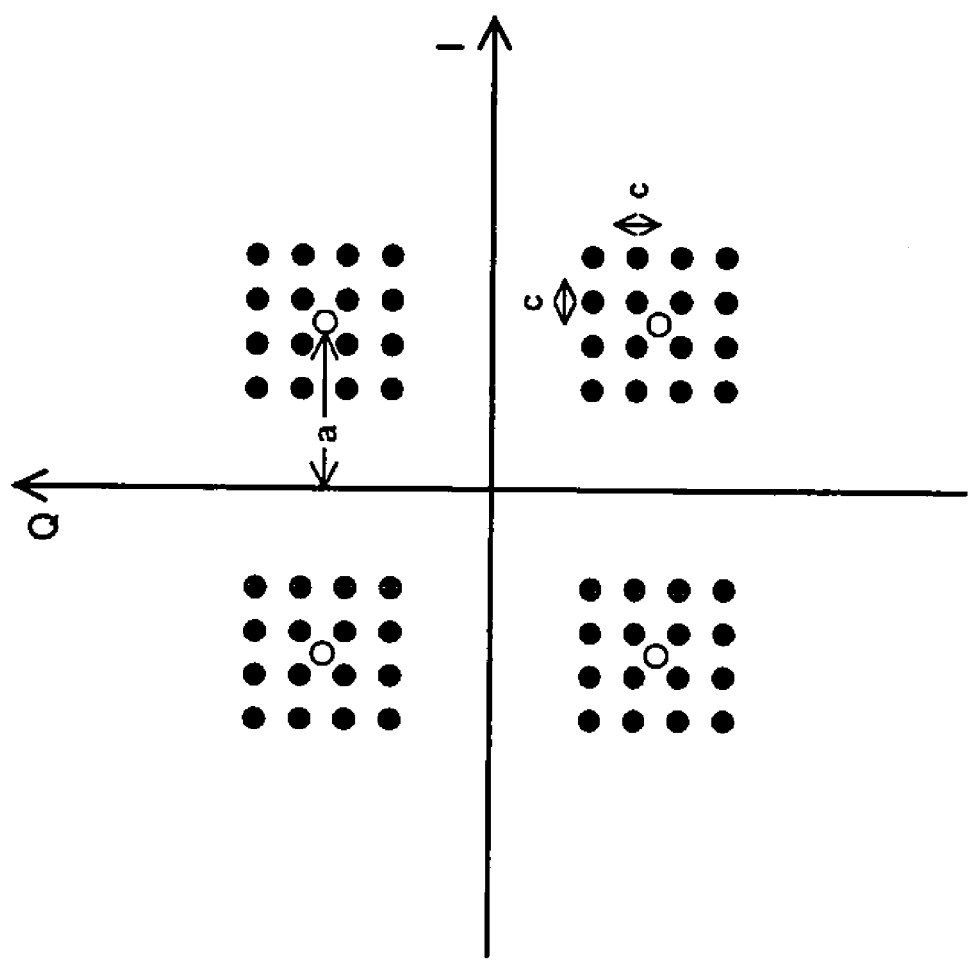
FIG. 12 shows another signal space diagram by modulation method C in accordance with the fifth exemplary embodiment of the present invention.

As an example of modulation method C, 4-bits per symbol are input and a modulation method having 16 types of signal-points are used in this embodiment; however, the present invention is not limited to this example. A modulation method, of which modulation level is further increased, can be used. For instance, 6-bits per symbol are input, and signal-space diagram can be formed as shown in FIG. 12.

In the case of using the signal space diagram by modulation method C as shown in FIG. 11, an average power of a symbol frame by method C becomes greater than that by QPSK modulation. If a system needs an identical power for transmitting a symbol frame by method C and a symbol frame by QPSK method, the amplitude at position "a" used as a reference in modulation method C can be corrected.

The signal space diagram by modulation method C is not limited to what is shown in FIG. 11, and the value of "b" is not limited to a/3. The value of "b" is not necessarily determined as a fixed value, and can be dynamically determined based on the communication quality at the forward link. Such a structure allows dynamic control of the reliability of the bits assigned to each symbol. The notifying means for notifying a communication device of communication quality can employ an example described in the third embodiment.

Exemplary Embodiment 6

The sixth embodiment describes a method of estimating the quality of received signals by using symbols having a higher modulation level and being inserted in parts of a burst.

Figure 13:
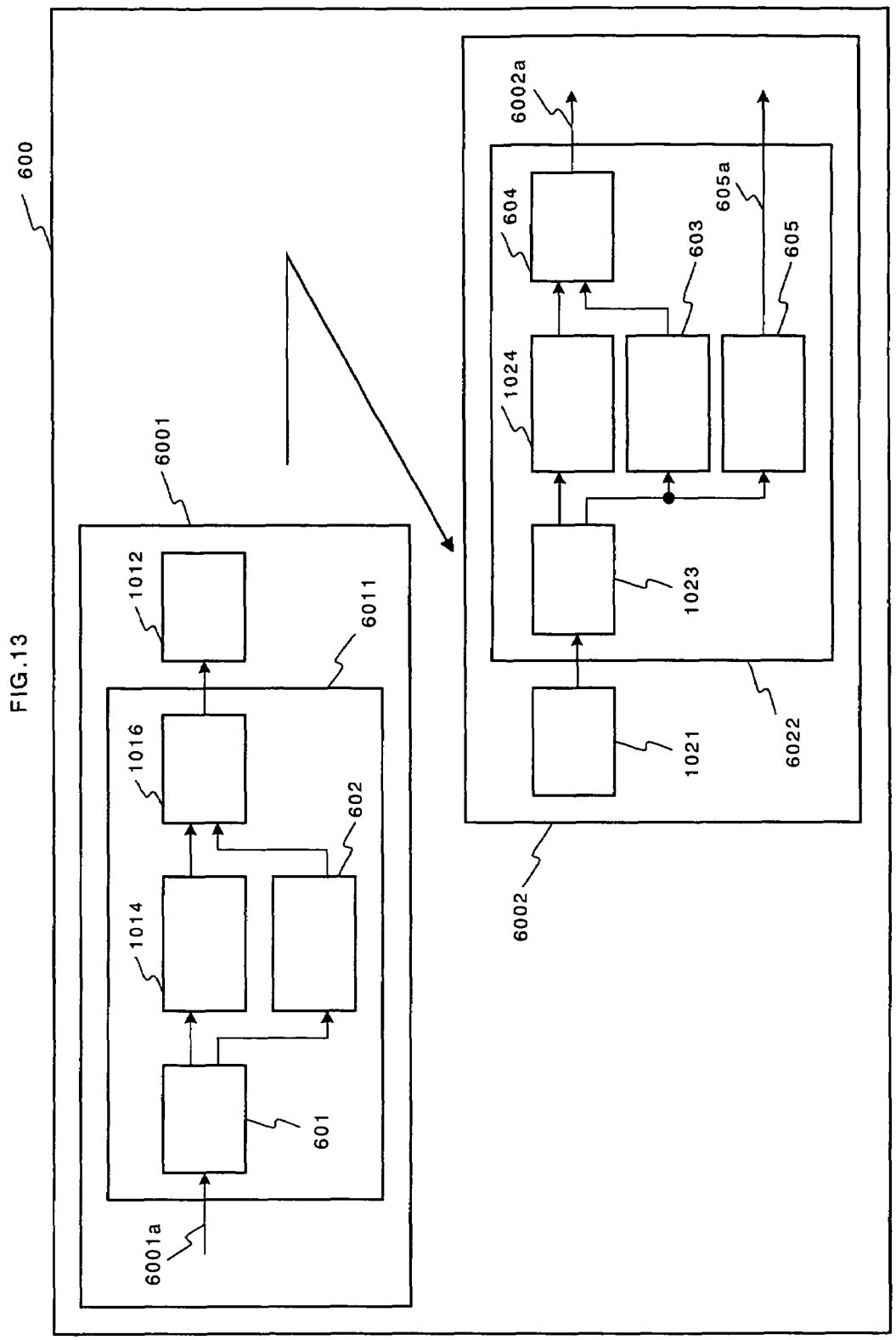
FIG. 13 shows a system diagram illustrating a communication system in accordance with a sixth exemplary embodiment of the present invention.

FIG. 13 shows a structure of communication system 600 in accordance with the sixth embodiment. System 600 differs from communication system 100 of FIG. 1 in data stream divider 601, modulation method B quadrature vector mapping section 602, modulation method B detector 603, data stream multiplexer 604, and reception quality estimator 605. Those elements have structures different from those of system 100, or operate differently from those of system 100. The other elements have similar structures or operate in similar ways to those of system 100.

Figure 10:
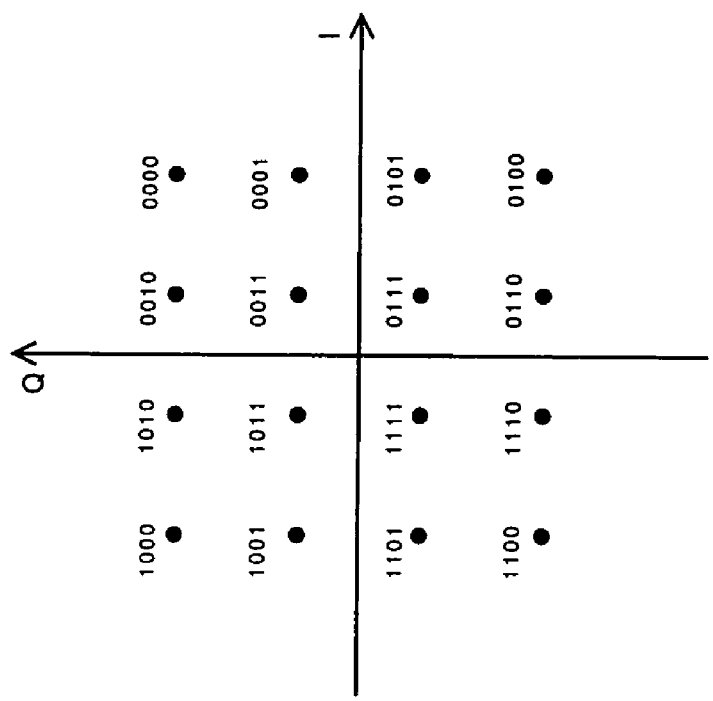
FIG. 10 shows a signal space diagram by modulation method B in accordance with the fourth exemplary embodiment of the present invention.
Figure 14:
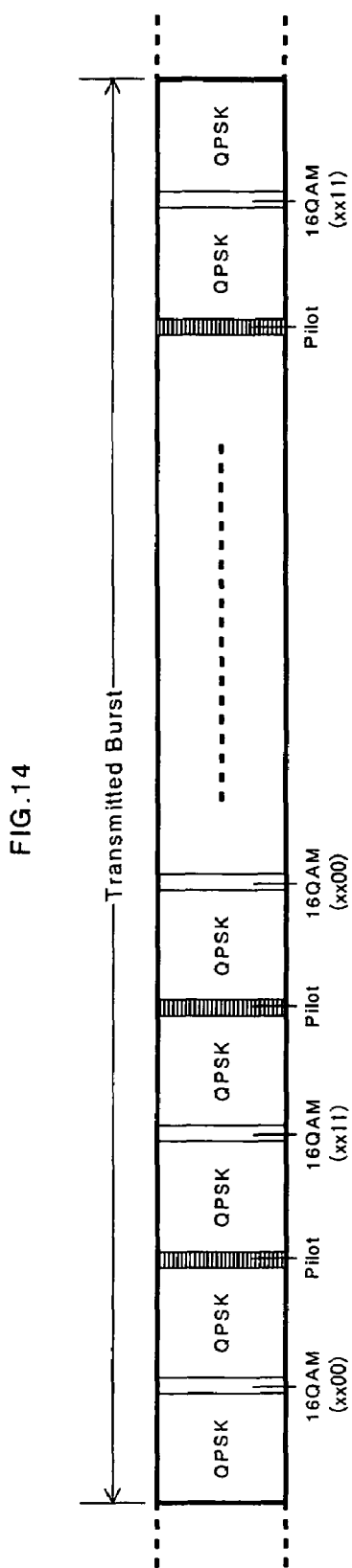
FIG. 14 shows a structure of a transmission burst in accordance with the sixth exemplary embodiment of the present invention.

Modulation method A employs QPSK modulation and modulation method B employs 16QAM which produces the signal space diagram as shown in FIG. 10. The structure of a burst transmitted from transmission device 6001 to reception device 6002 is shown in FIG. 14. The burst comprises a data symbol frame modulated by QPSK modulation, and the frame includes pilot symbols and symbols point-diagrammed by 16QAM, both of the symbols being periodically inserted.

Data stream divider 601 divides the data to be transmitted into the given number of data, and outputs them. Divider 601 differs from data stream divider 1013 of FIG. 1 in supplying only 2-bits instead of 4-bits to the symbol positions to which modulation method B is assigned. In other points, divider 601 operates in a similar way to divider 1013.

Modulation method B quadrature vector mapping section 602 uses the data stream supplied, thereby carrying out a signal space diagram according to a given modulation method. Section 602 operates in a similar way to modulation method B quadrature vector mapping section 1015 shown in FIG. 1 except the following point: modulation method B quadrature vector mapping section 602 receives bit data of only 2-bits instead of 4-bits, and the 2-bits are assigned to the higher two bits. To the lower two bits, "00" and "11" are alternately assigned in the order of symbol positions corresponding to modulation method B from the head of the burst.

Modulation method B detector 603 detects symbols of reception signals in response to modulation method B, and outputs the resultant data. In this embodiment, symbols are detected in response to 16QAM as modulation method B. Detector 603 supplies only higher 2-bits out of 4-bits obtained by the symbol detection to the data stream multiplexer as reception bit data. This operation differs from modulation method B detector 1025 shown in FIG. 1, and detector 603 operates in a similar way to detector 1025 in the other points.

Data stream multiplexer 604 multiplexes the data streams of two channels received by a given method, and output them as a data stream in one channel. To be more specific, multiplexer 604 multiplexes a data stream of 2-bits per symbol supplied from modulation method A detector 1024 and 2-bits per symbol supplied from detector 603 into a reception bit data stream following a given order based on the burst structure, then outputs the resultant data stream.

Reception quality estimator 605 uses signals at a given symbol position, where modulation method B is assigned, out of the burst signals received, thereby estimating the reception quality. To be more specific, estimator 605 estimates a bit-error rate if communication device 6002 receives signals modulated by 16QAM method under the present reception quality.

In the communication system discussed above, operations different from those of the first embodiment are described hereinafter.

Modulation method B quadrature vector mapping section 602 provides the symbols, to which modulation method B is assigned in a transmission burst, with a signal space diagram. At this time, the higher 2-bits are assigned with the bit data supplied from divider 601, and the lower 2-bits are assigned with (00) or (11) inserted as shown in FIG. 14. In FIG. 14, the descriptions of (xx00) and (xx11) at the symbol positions by 16QAM show a status where the higher 2-bits are detected by transmission bit data (xx), and the lower 2-bits are inserted by (00) and (11) alternately.

Figure 15B:
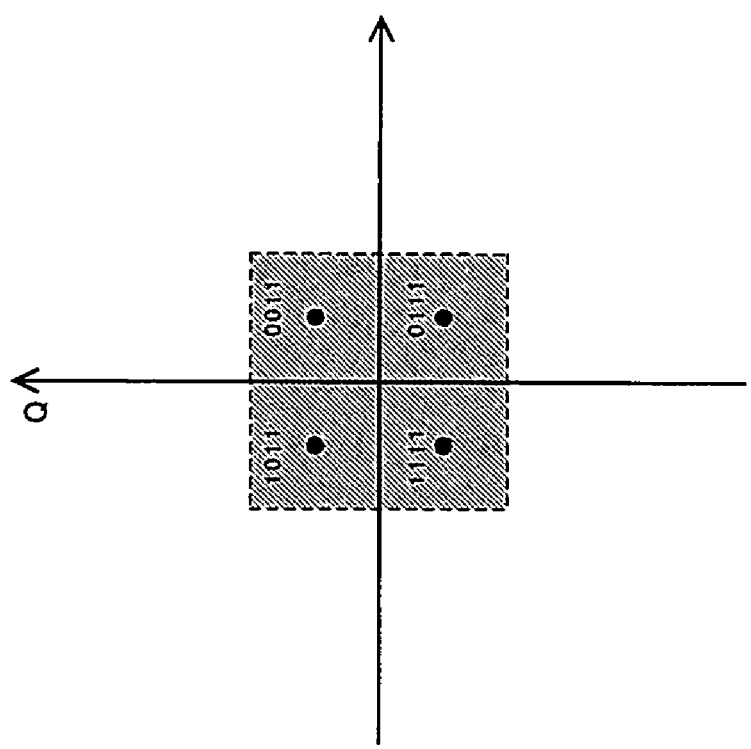
FIG. 15 shows a signal space diagram by modulation method B in accordance with the sixth exemplary embodiment of the present invention.
Figure 15A:
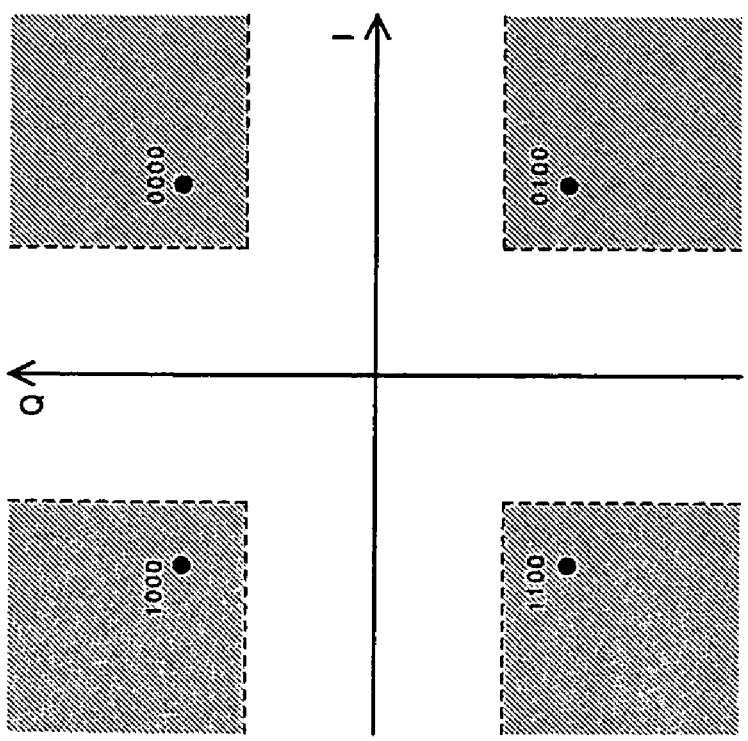

As a result, in the case of data of lower 2-bits being (00), as shown in FIG. 15A, four types of signal space diagram are available for the symbols by modulation method B in response to data of the higher 2-bits. In the case of data of lower 2-bits being (11), as shown in FIG. 15B four types of signal space diagram are available for the symbols by modulation method B in response to data of the higher 2-bits. Modulation method B detector 603 detects the reception symbols placed as discussed above, and outputs the higher 2-bits as reception data out of resultant 4-bits.

On the other hand, reception quality estimator 605 determines whether or not the reception vector of the symbol, at the position where (00) is inserted in the lower 2-bits of the signal space diagram by modulation method B, exists in a shadow area of FIG. 15A. In a similar manner to what is discussed above, estimator 605 determines whether or not the reception vector, at the position where (11) is inserted in the lower 2-bits, exists in the shadow area of FIG. 15B.

When a transmission path is in a poor environment, some signal points are received exceeding a given vector area due to influence of reception noises. In such a condition, estimator 605 outputs a quality estimation of poor communication quality.

As discussed above, this sixth embodiment proves that the quality, which indicates whether or not communication can be carried out at the reception with the signal space diagram by 16QAM method, can be estimated by the following method: a signal space diagram of given symbols in a transmission burst is in accordance with a like 16QAM method, and a known bit stream is inserted to the 2-bits increased per symbol before the transmission, then the quality discussed above can be estimated at the reception.

As a result, in a system where an adaptive modulation is available, e.g. all the symbols in a transmission burst supposed to be modulated by QPSK method are modulated by 16QAM instead, before data undergone 16QAM is transmitted, a signal space diagram is carried out by a like 16QAM method to parts of a symbol position, so that whether or not an error in symbol detection occurs can be estimated. The adaptive modulation thus can be switched more practically in response to the quality of the communication link, so that both of communication quality and communication capacity can be improved.

The present invention does not specify an output form of the estimation about the reception quality. There are various forms, e.g. quality of good or poor is determined whether or not at least one reception symbol exceeding a given area exists in a reception burst, or a ratio of the symbols exceeding the given area vs. ordinary symbols can be calculated for this purpose.

Figure 16B:
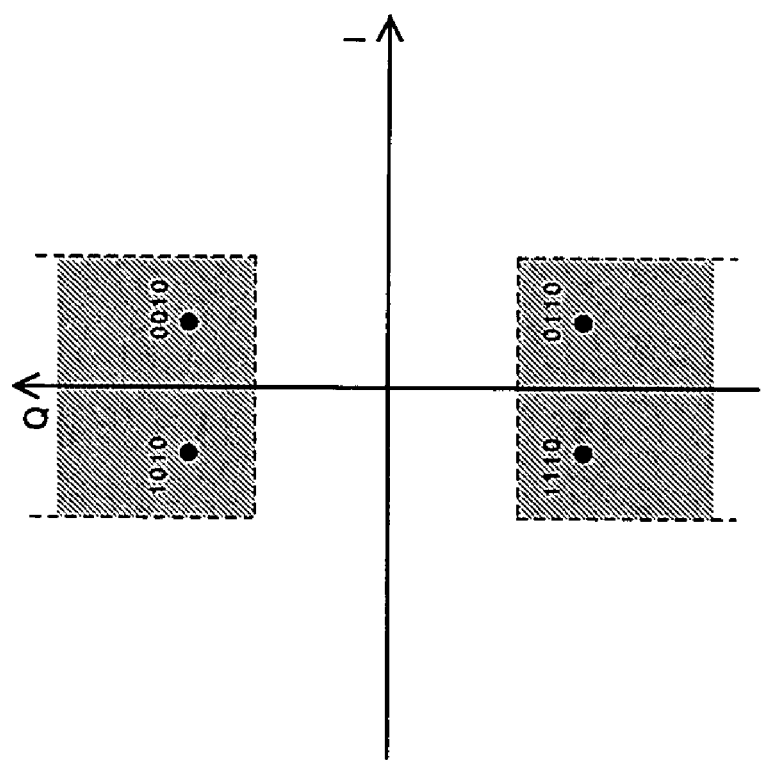
FIG. 16 shows another signal space diagram by modulation method B in accordance with the sixth exemplary embodiment of the present invention.
Figure 16A:
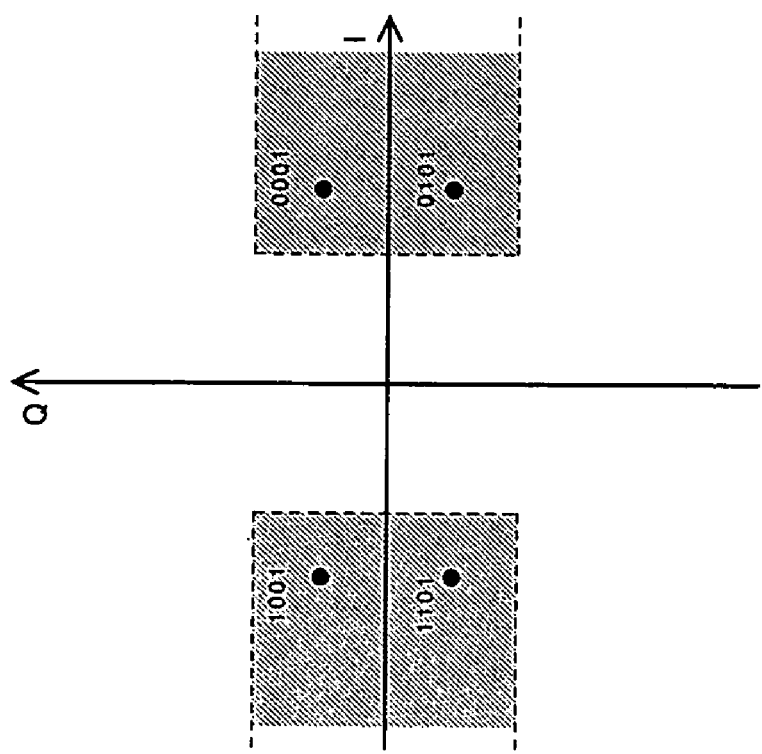

In this embodiment, (00) and (11) are alternately inserted to the lower 2-bits at the symbol position by modulation method B; however, the present invention is not limited to this example. For instance, as shown in FIG. 16, "01" and "10" can be alternately inserted, or another symbol pattern can be acceptable provided an identical power is not needed at symbol positions where QPSK modulation is assigned and at symbol positions where 16QAM is assigned.

Further, the signal space diagram can be changed to what is described in the fifth embodiment. In this case, the communication quality of a modulation method applied to a signal space diagram having any Euclidean distance can be estimated in a pseudo manner.

Exemplary Embodiment 7

This embodiment describes a method of assigning transmission packet data generated in a higher layer to a transmission burst in a physical layer when the packet size differs from the burst size.

Figure 17:
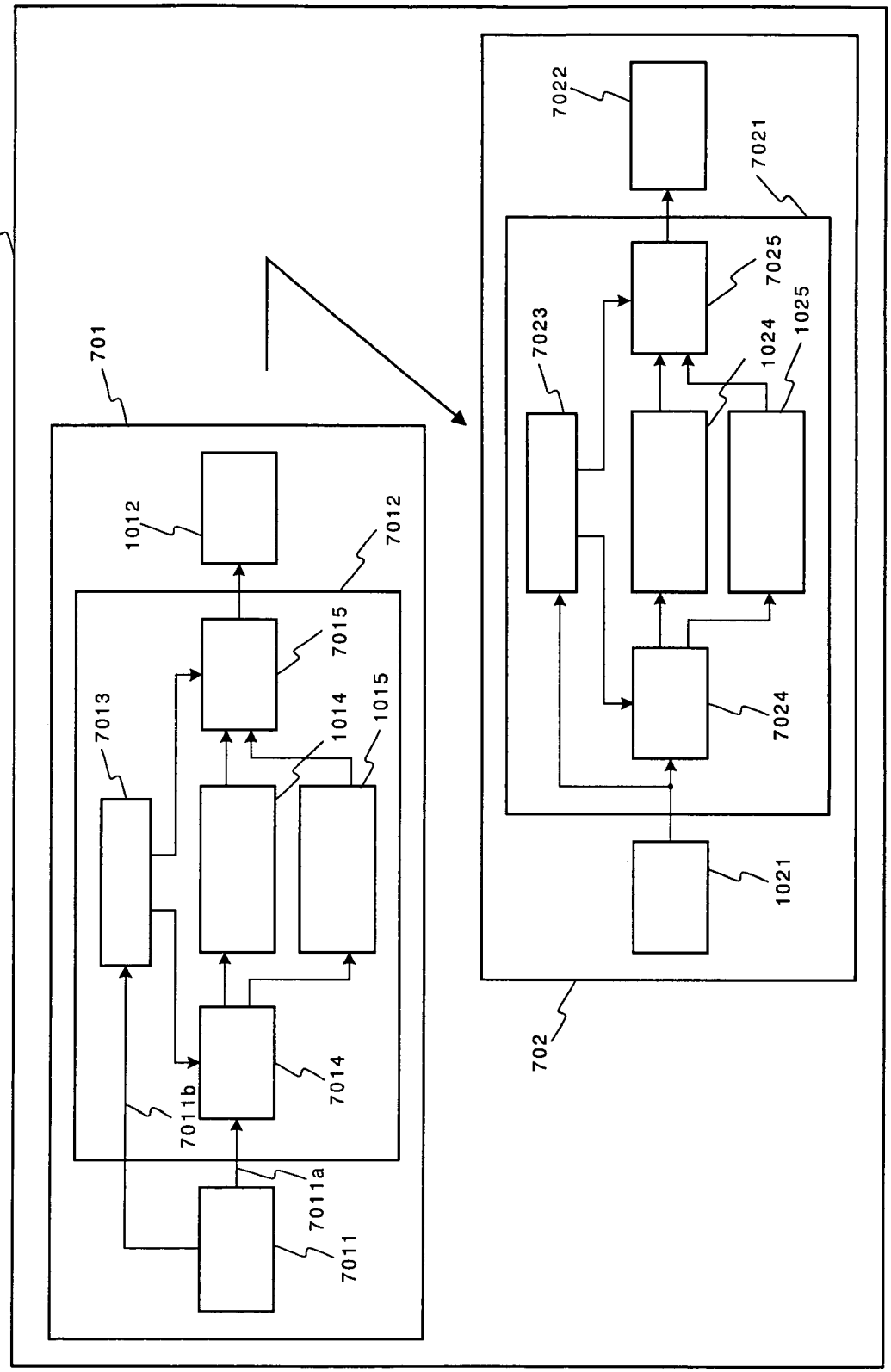
FIG. 17 shows a system diagram illustrating a communication system in accordance with a seventh exemplary embodiment of the present invention.
Figure 19:
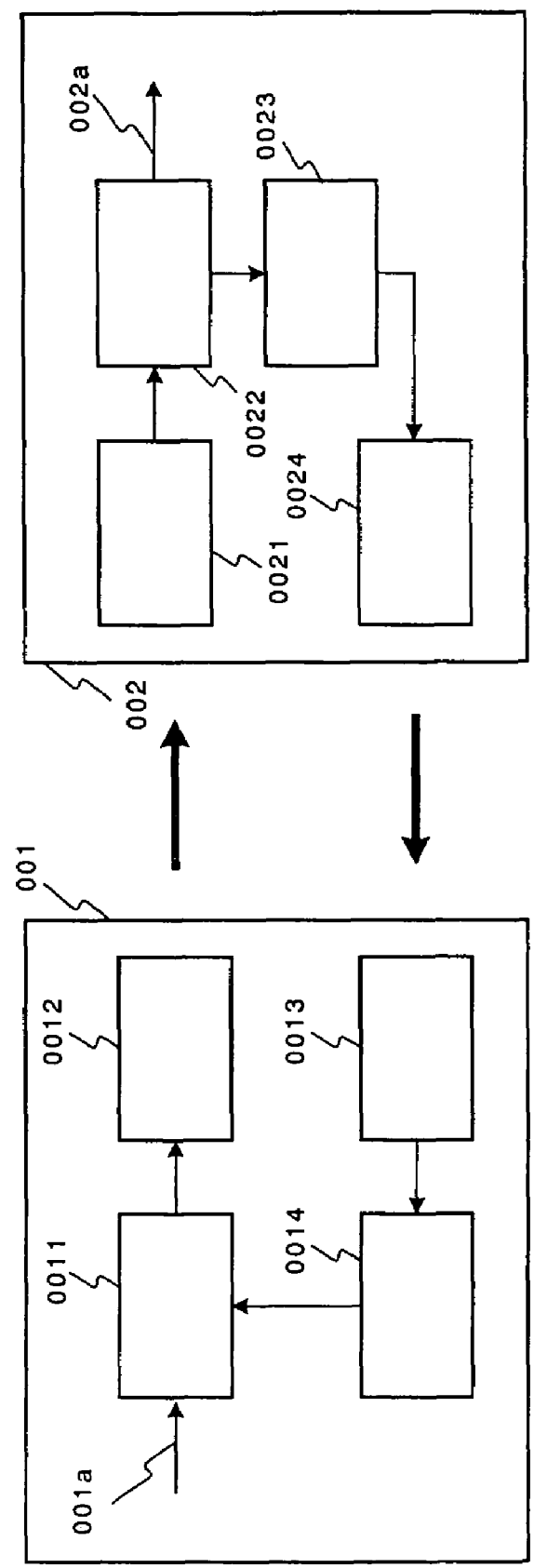
FIG. 19 shows a method of adaptive modulation using a higher modulation level in a conventional communication system.

FIG. 17 shows a structure of communication system 700 in accordance with the seventh embodiment. Transmission device 701 processes packet data in a given manner of the physical layer, then output the resultant data to reception device 702. Device 701 differs from transmission device 101 of FIG. 1 in additionally being equipped with transmission packet generator 7011 as well as controller 7013, and having another data stream divider 7014 and another multiplexer 7015 instead of data stream divider 1013 and multiplexer 1016. The other elements of device 701 than what are discussed above operate in a similar way to those having the same reference marks in FIG. 1.

Reception device 702 selectively receives signals addressed to itself, and processes the signals received in a given manner of the physical layer, thereby generating reception packet data. Device 702 differs from reception device 102 of FIG. 1 in additionally being equipped with controller 7023 as well as reception packet generator 7022. The other elements of device 702 than what are discussed above operate in a similar way to those having the same reference marks in FIG. 1.

To make a long story short, an error correction coding and an error detection coding are omitted here; however, those processes can be done when necessary.

In this embodiment, assume that transmission packet length is 8000 bits, transmission burst length is 800 symbols, and the burst structure shown in FIG. 18A is used. The transmission packet is formed of a preamble of 32 symbols, then data symbol of 15+16=31 symbols and a pilot symbol of 1 symbol, those 32 symbols in total form one block and there are 24 blocks, so that a burst of 800 symbols in total forms a transmission packet.

In the preamble or the pilot symbol, a known symbol or a known vector value is inserted, and they are, for instance, used for synchronizing a frequency or a time in receiving the burst. According to the foregoing structure, data symbol of 744 symbols are assigned to one burst. A data symbol frame in this burst is basically modulated by QPSK modulation method, so that data of 1488 bits per burst can be transmitted.

In the case of transmitting a packet of 8000 bits by using the foregoing burst, the transmission data cannot be divided by the number of data transmission bits per burst, so that a fraction is left. In this embodiment, the number of transmittable bits by 5 bursts is 7440 bits, so that 560 bits are left as a fraction.

According to a conventional transmission method, the fraction of 560 bits is assigned to the sixth burst, and dummy bits are inserted in remaining frames of the sixth burst. However, this conventional method wastes a line capacity supposed to be used for another transmission. This seventh embodiment thus inserts symbols having a higher modulation level into 5 bursts of transmission bursts, thereby increasing the number of data bits to be transmitted per burst. As a result, no fraction is left at the assignment of data bits to bursts.

Transmission packet generator 7011 supplies information 7011b about a packet size of transmission data to controller 7013. A method of transmitting the information of where in a burst the symbols (in this embodiment, symbols modulated by 16QAM) having a higher modulation level are inserted is not necessarily specified by the present invention. However, when a packet size and a burst size are determined in advance between transmission device 701 and reception device 702, the symbol positions to which the symbols modulated by 16QAM are inserted can be determined between device 701 and device 702.

When a packet size dynamically changes, a quantity of 16QAM symbols to be inserted and a rule how to select the insertion places are determined in advance between device 701 and device 702, and then the information about only the packet size can be transmitted between device 701 and device 702. In this case, a method of transmitting the information about the packet size is not specified by the present invention;

however, for instance, symbol frames which will not be replaced with the symbols having the higher modulation level are reserved so that the information can be inserted to the frames reserved.

When a packet size changes not so frequently, a burst to be used for system controlling and transmitted periodically by a regular modulation method can be used for transmitting the foregoing information.

Controller 7013 determines the quantity and the insertion places of the symbols having a higher modulation level based on information 7011*b* about the transmission packet size and the information stored in advance about the transmission burst size. In this embodiment, total 560 bits of 5 bursts must be superposed, so that 112 bits per burst can be superimposed.

As shown in FIG. 18B, two symbols modulated by 16QAM method are thus inserted into each one block formed of 32 symbols and one pilot symbol in between the 32 symbols, so that 96 bits can be superposed to 24 blocks, namely, 2×24×2=96. In addition to this, 8 symbols around the preamble can be modulated by 16QAM method, so that 2×8=16 bits can be superposed. As a result, 96+16=112 bits can be superposed.

The reason why many 16QAM symbols are inserted around the preamble is that the accuracy of time sync. or frequency sync. is relatively excellent around the preamble, so that excellent reception quality can be expected; however, the 16QAM symbols are not necessarily inserted in this place.

As discussed above, data of 112 bits per burst can be superposed, so that a burst which can transmits data of 1488+112=1600 bits is generated by controller 7013, which controls data stream divider 7014 and multiplexer 7015 to divide the transmission data and to multiplex the symbols modulated based on the positional relation shown in FIG. 18B.

Controller 7023 of reception device 702 controls divider 7024 and data stream multiplexer 7025 to divide the symbols received and to multiplex the data stream in the order according to the burst structure shown in FIG. 18B. When a quantity and insertion places of 16QAM symbols are determined in advance, controller 7023 can follow a given procedure; however, if the quantity and the insertion places change dynamically, and information about the changes is included in a transmission signal, this information can be extracted from the signal received.

As discussed above, using reception burst data supplied from data stream multiplexer 7025, reception packet data generator 7022 can generate reception packet data.

This seventh embodiment thus can prevent an occurrence of a fraction when transmission data is assigned to a burst, so that a transmission burst is not wasted and a line capacity can be efficiently used by the following method: the bits of a fraction, which is left at an assignment of transmission data packet to a burst, are inserted in a transmission burst by increasing a modulation level per symbol.

The present invention does not specify which bit data in a transmission data packet is assigned to the bits (in this seventh embodiment, the 2-bits out of a symbol modulated by 16QAM) having a higher modulation level. However, for instance, bit data can be assigned to the symbol on the time series in response to the bit sequence in the packet, or the final bit of fraction in the packet can be assigned to each 2-bits of the 16QAM symbol. Further, bit data of less important frames can be assigned, in response to the importance of the data in the transmission data packet, to the bits of the higher modulation level.

Respective methods described in embodiments 1-7 can be carried out according to a program of processors such as DSP or CPU in which a process procedure is described, so that a processor and a recording medium can practice those methods. The respective methods described in embodiments 1-7 are demonstrated in an environment of radio transmission; however, they can be practiced with ease in an environment of cable transmission.

INDUSTRIAL APPLICABILITY

According to the present invention, a symbol having a higher modulation level is inserted on a symbol basis into a transmission burst formed at the transmission, and the burst received is processed in response to the process provided at the transmission. This method allows advantageously increasing an amount of bit data transmittable per burst, so that this method can be useful as a data transmission method and a data reception method in a communication system which transmits signals modulated on a burst basis. The method is also useful for a transmission device and a reception device that adopt the foregoing data transmission and reception methods, and useful for a communication system employs the foregoing methods and devices.

The invention claimed is:

1. A wireless data transmission device of a communication system that carries out data communication on a burst basis by digital modulation, the transmission device comprising:
   a data stream dividing means for dividing transmission data at a given ratio;
   a first quadrature vector mapping means for providing a first divided data with a signal space diagram according to a first modulation method;
   a second quadrature vector mapping means for providing a second divided data with a signal space diagram according to a second modulation method having a higher modulation level than the first modulation method based on a communication control information, the information being for determining a modulation level on respective data symbols and known to a receiver; and
   a multiplexing means for placing a symbol modulated by the first modulation method and a symbol modulated by the second modulation method at given places respectively, then multiplexing a transmission burst, the symbol modulated by the second modulation method being multiplexed in a position contiguous to the symbol modulated by the first modulation method;
   wherein the given ratio is defined by a number of data symbols modulated by the first modulation method being more than a number of data symbols modulated by the second modulation method;
   a transmission packet generating means for generating and outputting transmission data on a packet basis based on a process in a higher layer, and also generating a transmission packet which outputs information about a size of the packet; and
   a transmission control means for detecting a quantity and an insertion place of the data symbol having the higher modulation level based on the information about a size of the transmission packet and information about a size of a burst in a physical layer, and for controlling a data separation by the data stream dividing means and a content of the burst generated by the multiplexing means based on information about a determined quantity and a determined insertion place about the symbol.

2. The wireless data transmission device as defined in claim 1, wherein the transmission control means controls the multiplexing means such that the information about the packet size is inserted in the transmission burst.

3. A method of wireless transmitting data on a burst signal basis, the method comprising the steps of:

inserting at least one data symbol of a second modulation method based on a communication control information into a data symbol stream of a first modulation method, the at least one data symbol of the second modulation method being inserted into the data symbol stream contiguous to a data symbol of the first modulation method, wherein the second modulation method has more modulation levels than the first modulation method, and wherein a number of data symbols of the first modulation method in a transmission burst is more than a number of data symbols of the second modulation method;

transmitting the transmission burst including the data symbol of the first modulation method and the data symbol of the second modulation method;

generating and outputting transmission data on a packet basis based on a process in a higher layer, and also generating a transmission packet which outputs information about a size of the packet; and controlling transmission for detecting a quantity and an insertion place of the data symbol having the higher modulation level based on the information about a size of the transmission packet and information about a size of a burst in a physical layer, and controlling a data separation in a data stream dividing step for dividing a data stream based on information about a determined quantity and a determined insertion place about the symbol, and also controlling a content of the burst generated in a multiplexing step which generates a transmission burst.

4. The method of wireless transmitting data as defined in claim 3, wherein the transmission control step controls the multiplexing step such that the information about the packet size is inserted in the transmission burst.

* * * * *